US008907987B2

(12) United States Patent
Chowdhry et al.

(10) Patent No.: US 8,907,987 B2
(45) Date of Patent: Dec. 9, 2014

(54) SYSTEM AND METHOD FOR DOWNSIZING VIDEO DATA FOR MEMORY BANDWIDTH OPTIMIZATION

(75) Inventors: Anita Chowdhry, Saratoga, CA (US); Subir Ghosh, San Jose, CA (US)

(73) Assignee: nComputing Inc., Santa Clara, CA (US)

( * ) Notice: Subject to any disclaimer, the term of this patent is extended or adjusted under 35 U.S.C. 154(b) by 511 days.

(21) Appl. No.: 12/908,365

(22) Filed: Oct. 20, 2010

(65) Prior Publication Data

US 2012/0098864 A1 Apr. 26, 2012

(51) Int. Cl.

| | |
|---|---|
| ***G09G 5/00*** | (2006.01) |
| ***G06T 3/40*** | (2006.01) |
| ***G09G 5/36*** | (2006.01) |
| ***H04N 7/01*** | (2006.01) |
| ***G09G 5/14*** | (2006.01) |
| ***G09G 5/393*** | (2006.01) |
| ***G09G 5/395*** | (2006.01) |
| ***G09G 5/397*** | (2006.01) |

(52) U.S. Cl.

CPC .................. *G09G 5/14* (2013.01); *G09G 5/393* (2013.01); *G09G 5/395* (2013.01); *G09G 5/397* (2013.01); *G09G 2340/02* (2013.01); *G09G 2340/0407* (2013.01); *G09G 2350/00* (2013.01); *G09G 2360/18* (2013.01); *G09G 2370/022* (2013.01)

USPC ............................ 345/660; 345/545; 348/441

(58) Field of Classification Search

None

See application file for complete search history.

(56) References Cited

U.S. PATENT DOCUMENTS 5,402,147 A 3/1995 Chen et al.
5,469,223 A * 11/1995 Kimura ........................ 348/581

(Continued)

FOREIGN PATENT DOCUMENTS

TW 200948087 A1 11/2009
WO WO-2009108345 A2 9/2009

(Continued)

OTHER PUBLICATIONS

"International Application Serial No. PCT/US2009/001239, International Preliminary Report on Patentability mailed Sep. 10, 2010", 7 pgs.

(Continued)

*Primary Examiner* — Xiao M. Wu
*Assistant Examiner* — Matthew D Salvucci
(74) *Attorney, Agent, or Firm* — Schwegman Lundberg & Woessner, P.A.

(57) ABSTRACT

The video output system in a computer system reads pixel information from a frame buffer to generate a video output signal. In addition, full-motion video may also be displayed in a window defined in the frame buffer. If the native resolution of the full-motion video is larger than the window defined in said frame buffer then valuable memory space and memory bandwidth is being wasted by writing said larger full-motion video in a memory system (and later reading it back) when some data from the full-motion video will be discarded. Thus, a video pre-processor is disclosed to reduce the size of the full-motion video before that full-motion video is written into a memory system. The video pre-processor will scale the full-motion video down to a size no larger than the window defined in the frame buffer.

24 Claims, 29 Drawing Sheets

(56) References Cited

U.S. PATENT DOCUMENTS

| | | | | |
|---|---|---|---|---|
| 5,844,541 | A | 12/1998 | Cahill, III | |
| 5,995,120 | A | 11/1999 | Dye | |
| 6,014,125 | A * | 1/2000 | Herbert | 345/660 |
| 6,278,645 | B1 | 8/2001 | Buckelew et al. | |
| 6,313,822 | B1 | 11/2001 | McKay et al. | |
| 6,362,836 | B1 | 3/2002 | Shaw et al. | |
| 6,411,333 | B1 | 6/2002 | Auld et al. | |
| 6,448,974 | B1 * | 9/2002 | Asaro et al. | 345/591 |
| 6,516,283 | B2 | 2/2003 | McCall et al. | |
| 6,519,283 | B1 | 2/2003 | Cheney et al. | |
| 6,563,517 | B1 | 5/2003 | Bhagwat et al. | |
| 7,028,025 | B2 | 4/2006 | Collins | |
| 7,126,993 | B2 | 10/2006 | Kitamura et al. | |
| 7,127,525 | B2 | 10/2006 | Coleman et al. | |
| 7,400,328 | B1 | 7/2008 | Ye et al. | |
| 7,746,346 | B2 | 6/2010 | Woo | |
| 7,864,186 | B2 | 1/2011 | Robotham et al. | |
| 8,131,816 | B2 | 3/2012 | Robinson et al. | |
| 8,131,817 | B2 | 3/2012 | Duursma et al. | |
| 8,279,138 | B1 | 10/2012 | Margulis | |
| 8,749,566 | B2 | 6/2014 | Chowdhry et al. | |
| 2002/0183958 | A1 | 12/2002 | McCall et al. | |
| 2004/0062309 | A1 | 4/2004 | Romanowski et al. | |
| 2004/0228365 | A1 | 11/2004 | Kobayashi | |
| 2005/0021726 | A1 | 1/2005 | Denoual | |
| 2006/0028583 | A1 | 2/2006 | Lin et al. | |
| 2006/0282855 | A1 | 12/2006 | Margulis | |
| 2007/0132784 | A1 | 6/2007 | Easwar et al. | |
| 2007/0182748 | A1 | 8/2007 | Woo | |
| 2009/0128572 | A1 * | 5/2009 | MacInnis et al. | 345/519 |
| 2009/0279609 | A1 | 11/2009 | De Haan et al. | |
| 2009/0303156 | A1 | 12/2009 | Ghosh et al. | |
| 2012/0120320 | A1 | 5/2012 | Chowdhry et al. | |
| 2012/0127185 | A1 | 5/2012 | Chowdhry et al. | |

FOREIGN PATENT DOCUMENTS

| | | | |
|---|---|---|---|
| WO | WO-2009108345 | A3 | 12/2009 |
| WO | WO-2012054720 | A1 | 4/2012 |
| WO | WO-2012068242 | A1 | 5/2012 |

OTHER PUBLICATIONS

"International Application Serial No. PCT/US2009/01239, International Search Report mailed Apr. 21, 2009", 4 pgs.

"International Application Serial No. PCT/US2009/01239, Written Opinion mailed Apr. 21, 2009", 4 pgs.

"U.S. Appl. No. 12/947,294, Preliminary Amendment mailed Nov. 2, 2011", 3 pgs.

"U.S. Appl. No. 12/947,294, Preliminary Amendment mailed Nov. 10, 2011", 3 pgs.

"International Application Serial No. PCT/US2011/057089, Search Report Mailed Jan. 23, 2012", 4 pgs.

"International Application Serial No. PCT/US2011/057089, Written Opinion Mailed Jan. 23, 2012", 4 pgs.

"International Application Serial No. PCT/US2011/060982, International Search Report mailed Mar. 19, 2012", 2 pgs.

"International Application Serial No. PCT/US2011/060982, Written Opinion mailed Mar. 19, 2012", 5 pgs.

"U.S. Appl. No. 12/395,152 , Response filed Oct. 15, 2012 to Non Final Office Action mailed Jul. 19, 2012", 12 pgs.

"U.S. Appl. No. 12/395,152, Final Office Action mailed Jan. 4, 2013", 13 pgs.

"U.S. Appl. No. 12/395,152, Non Final Office Action mailed Jul. 19, 2012", 10 pgs.

"U.S. Appl. No. 12/395,152, Response filed Apr. 4, 2013 to Final Office Action mailed Jan. 4, 2013", 11 pgs.

"U.S. Appl. No. 12/947,294, Examiner Interview Summary mailed Jan. 25, 2013", 3 pgs.

"U.S. Appl. No. 12/947,294, Final Office Action mailed May 23, 2013", 24 pgs.

"U.S. Appl. No. 12/947,294, Non Final Office Action mailed Aug. 30, 2012", 15 pgs.

"U.S. Appl. No. 12/947,294, Response filed Nov. 30, 2012 to Non Final Office Action mailed Aug. 30, 2012", 13 pgs.

"U.S. Appl. No. 12/947,294, Supplemental Response filed Jan. 25, 2013 to Non Final Office Action mailed Aug. 30, 2012", 15 pgs.

"Chinese Application Serial No. 200980113099.3, Office Action mailed Sep. 26, 2012", with English translation of claims, 14 pgs.

"Chinese Application Serial No. 200980113099.3, Response filed Apr. 11, 2013 to Office Action mailed Sep. 26, 2012", with English translation of claims, 13 pgs.

"International Application Serial No. PCT/US2011/057089, International Preliminary Report on Patentability mailed May 2, 2013", 6 pgs.

"International Application Serial No. PCT/US2011/060982, International Preliminary Report on Patentability mailed May 30, 2013", 7 pgs.

"U.S. Appl. No. 12/395,152, Non Final Office Action mailed Aug. 29, 2013", 11 pgs.

"U.S. Appl. No. 12/395,152, Response filed Nov. 22, 2013 to Non Final Office Action mailed Aug. 29, 2013", 12 pgs.

"U.S. Appl. No. 12/947,294, Response filed Aug. 23, 2013 to Non Final Office Action mailed May 23, 2013", 15 pgs.

"Chinese Application Serial No. 200980113099.3, Office Action mailed Jul. 31, 2013", 12 pgs.

"U.S. Appl. No. 12/395,152, Final Office Action mailed Dec. 19, 2013", 12 pgs.

"U.S. Appl. No. 13/301,429, Non Final Office Action mailed Dec. 11, 2013", 25 pgs.

"BitMatrix", (Colt 1.2.0—API Specification), Version 1.2.0, Last Published., Retrieved from the Internet: <URL:http://acs.lbl.gov/software/colt/api/cern/colt/bitvector/BitMatrix.html>, (Sep. 9, 2004), 10 pgs.

U.S. Appl. No. 12/395,152, Amendment and Response filed Sep. 15, 2014 to Non-Final Office Action mailed Jun. 13, 2014, 13 pgs.

U.S. Appl. No. 12/395,152, Non Final Office Action mailed Jun. 13, 2014, 11 pgs.

U.S. Appl. No. 12/395,152, Response filed Mar. 19, 2014 to Final Office Action mailed Dec. 19, 2013, 11 pgs.

U.S. Appl. No. 13/301,429, Notice of Allowance mailed Apr. 7, 2014, 9 pgs.

U.S. Appl. No. 13/301,429, Response filed Mar. 11, 2014 to Non Final Office Action mailed Dec. 11, 2013, 12 pgs.

* cited by examiner

| | Byte0 | Byte1 | Byte2 | Byte3 | Byte4 | Byte5 | Byte6 | Byte7 |
|---|---|---|---|---|---|---|---|---|
| Craddr(0) | Cr00 | Cr01 | Cr02 | Cr03 | Cr04 | Cr05 | Cr06 | Cr07 |
| Craddr(1) | Cr10 | Cr11 | Cr12 | Cr13 | Cr14 | Cr15 | Cr16 | Cr17 |
| Craddr(2) | Cr20 | Cr21 | Cr22 | Cr23 | Cr24 | Cr25 | Cr26 | Cr27 |
| Craddr(3) | Cr30 | Cr31 | Cr32 | Cr33 | Cr34 | Cr35 | Cr36 | Cr37 |
| Craddt(4) | Cr40 | Cr41 | Cr42 | Cr43 | Cr44 | Cr45 | Cr46 | Cr47 |
| Craddr(5) | Cr50 | Cr51 | Cr52 | Cr53 | Cr54 | Cr55 | Cr56 | Cr57 |
| Craddr(6) | Cr60 | Cr61 | Cr62 | Cr63 | Cr64 | Cr65 | Cr66 | Cr67 |
| Craddr(7) | Cr70 | Cr71 | Cr72 | Cr73 | Cr74 | Cr75 | Cr76 | Cr77 |

Figure 10C

Figure 12A

| | Byte0 | Byte1 | Byte2 | Byte3 | Byte4 | Byte5 | Byte6 | Byte7 | Byte8 | Byte9 | | Byte (n-4) | Byte (n-3) | Byte (n-2) | Byte (n-1) | Byten |
|---|---|---|---|---|---|---|---|---|---|---|---|---|---|---|---|---|
| FBYaddr(0) | Y00 | Y01 | Y02 | Y03 | Y04 | Y05 | Y06 | Y07 | Y08 | Y09 | -------- | Y0 (n-4) | Y0 (n-3) | Y0 n-2) | Y0 (n-1) | Y0n |
| FBYaddr(1) | Y10 | Y11 | Y12 | Y13 | Y14 | Y15 | Y16 | Y17 | Y18 | Y19 | -------- | Y1 (n-4) | Y1 (n-3) | Y1 (n-2) | Y1 (n-1) | Y1n |
| FBYaddr(m) | Ym0 | Ym1 | Ym2 | Ym3 | Ym4 | Ym5 | Ym6 | Ym7 | Ym8 | Ym9 | -------- | Ym (n-4) | Ym (n-3) | Ym (n-2) | Ym (n-1) | Ymn |

Figure 12B

| | Byte0 | Byte1 | Byte2 | Byte3 | Byte4 | Byte5 | Byte6 | Byte7 | Byte8 | Byte9 | | Byte (2q-4) | Byte (2q-3) | Byte (2q-2) | Byte (2q-1) | Byte2q |
|---|---|---|---|---|---|---|---|---|---|---|---|---|---|---|---|---|
| FBCaddr(0) | Cb00 | Cr00 | Cb01 | Cr01 | Cb02 | Cr02 | Cb03 | Cr03 | Cb04 | Cr04 | -------- | Cr0 (q-2) | Cb0 (q-1) | Cr0 (q-1) | Cb0q | Cr0q |
| FBCaddr(q) | Cb10 | Cr10 | Cb11 | Cr11 | Cb12 | Cr12 | Cb13 | Cr13 | Cb14 | Cr14 | -------- | Cr1 (q-2) | Cb1 (q-1) | Cr1 (q-1) | Cb1q | Cr1q |
| FBCaddr(pq) | Cbp0 | Crp0 | Cbp1 | Crp1 | Cbp2 | Crp2 | Cbp3 | Crp3 | Cbp4 | Crp4 | -------- | Crp (q-2) | Cbp (q-1) | Crp (q-1) | Cbpq | Crpq |

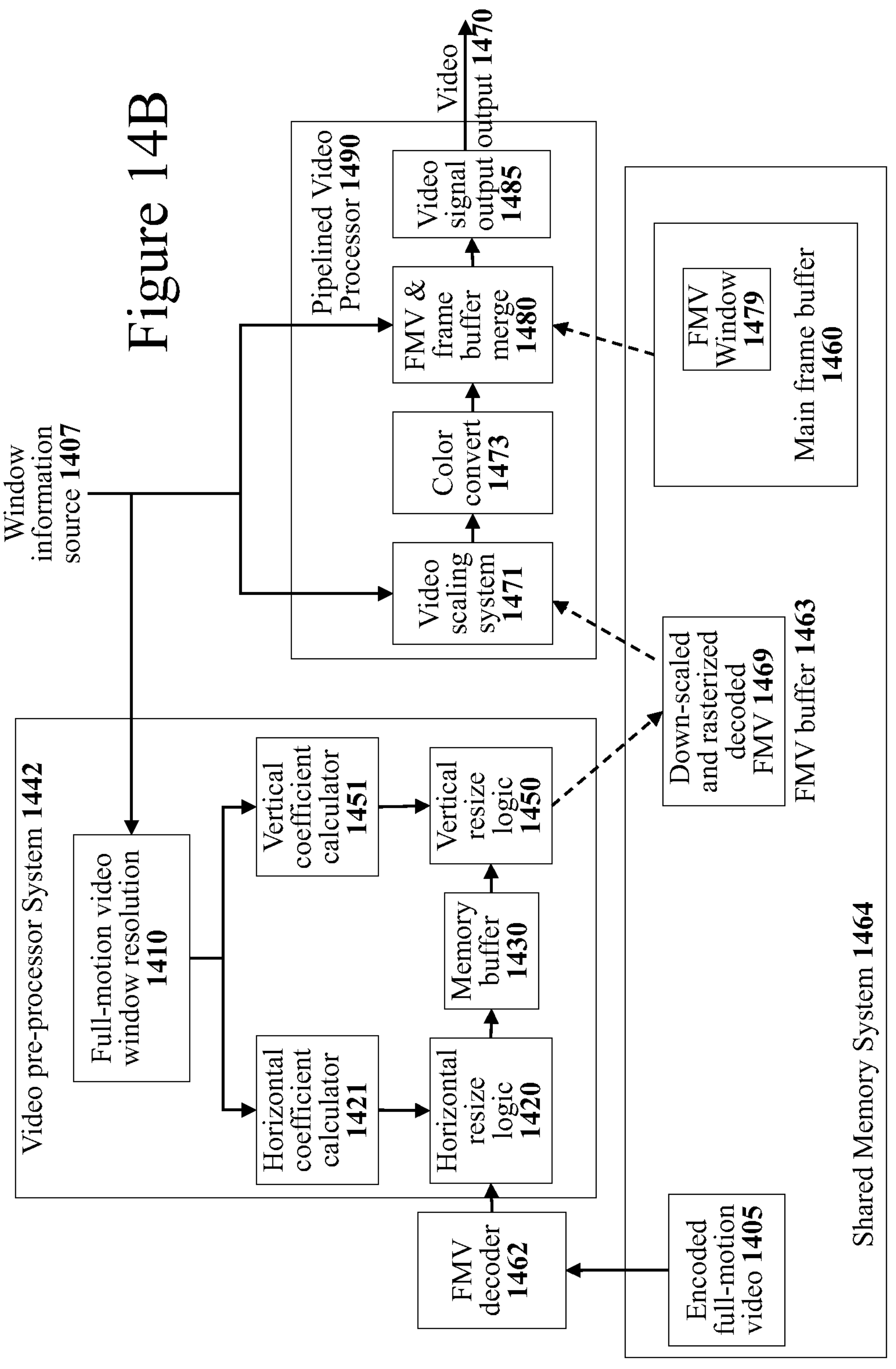
Figure 14B
Window information source 1407
Video pre-processor System 1442
Full-motion video window resolution 1410
Horizontal coefficient calculator 1421
Vertical coefficient calculator 1451
Horizontal resize logic 1420
Memory buffer 1430
Vertical resize logic 1450
FMV decoder 1462
Pipelined Video Processor 1490
Video scaling system 1471
Color convert 1473
FMV & frame buffer merge 1480
Video signal output 1485
Video output 1470
Shared Memory System 1464
Encoded full-motion video 1405
Down-scaled and rasterized decoded FMV 1469
FMV buffer 1463
FMV Window 1479
Main frame buffer 1460

| | Byte0 | Byte1 | Byte2 | Byte3 | Byte4 | Byte5 | ... | Byte58 | Byte59 | Byte60 | Byte61 | Byte62 | Byte63 |
|---|---|---|---|---|---|---|---|---|---|---|---|---|---|
| Line0 | Y0.0 | Y0.1 | Y0.2 | Y0.3 | Y0.4 | Y0.5 | ... | Y0.58 | Y0.59 | Y0.60 | Y0.61 | Y0.62 | Y0.63 |
| Line1 | Y1.0 | Y1.1 | Y1.2 | Y1.3 | Y1.4 | Y1.5 | ... | Y1.58 | Y1.59 | Y1.60 | Y1.61 | Y1.62 | Y1.63 |
| Line2 | Y2.0 | Y2.1 | Y2.2 | Y2.3 | Y2.4 | Y2.5 | ... | Y2.58 | Y2.59 | Y2.60 | Y2.61 | Y2.62 | Y2.63 |
| Line3 | Y3.0 | Y3.1 | Y3.2 | Y3.3 | Y3.4 | Y3.5 | ... | Y3.58 | Y3.59 | Y3.60 | Y3.61 | Y3.62 | Y3.63 |
| ... | | | | | | | | | | | | | |
| Line12 | Y12.0 | Y12.1 | Y12.2 | Y12.3 | Y12.4 | Y12.5 | ... | Y12.58 | Y12.59 | Y12.60 | Y12.61 | Y12.62 | Y12.63 |
| Line13 | Y13.0 | Y13.1 | Y13.2 | Y13.3 | Y13.4 | Y13.5 | ... | Y13.58 | Y13.59 | Y13.60 | Y13.61 | Y13.62 | Y13.63 |
| Line14 | Y14.0 | Y14.1 | Y14.2 | Y14.3 | Y14.4 | Y14.5 | ... | Y14.58 | Y14.59 | Y14.60 | Y14.61 | Y14.62 | Y14.63 |
| Line15 | Y15.0 | Y15.1 | Y15.2 | Y15.3 | Y15.4 | Y15.5 | ... | Y15.58 | Y15.59 | Y15.60 | Y15.61 | Y15.62 | Y15.63 |

Figure 15A

| | Byte0 | Byte1 | Byte2 | Byte3 | Byte4 | Byte5 | | Byte58 | Byte59 | Byte60 | Byte61 | Byte62 | Byte63 |
|---|---|---|---|---|---|---|---|---|---|---|---|---|---|
| Line0 | Y0.0 | Y0.2 | Y0.4 | Y0.6 | Y0.8 | Y0.10 | → | Y0.116 | Y0.118 | Y0.120 | Y0.122 | Y0.124 | Y0.126 |
| Line1 | Y1.0 | Y1.2 | Y1.4 | Y1.6 | Y1.8 | Y1.10 | → | Y1.116 | Y1.118 | Y1.120 | Y1.122 | Y1.124 | Y1.126 |
| Line6 | Y2.0 | Y2.2 | Y2.4 | Y2.6 | Y2.8 | Y2.10 | → | Y2.116 | Y2.118 | Y2.120 | Y2.122 | Y2.124 | Y2.126 |
| Line7 | Y3.0 | Y3.2 | Y3.4 | Y3.6 | Y3.8 | Y3.10 | → | Y3.116 | Y3.118 | Y3.120 | Y3.122 | Y3.124 | Y3.126 |
| Line12 | Y12.0 | Y12.2 | Y12.4 | Y12.6 | Y12.8 | Y12.10 | → | Y12.116 | Y12.118 | Y12.120 | Y12.122 | Y12.124 | Y12.126 |
| Line13 | Y13.0 | Y13.2 | Y13.4 | Y13.6 | Y13.8 | Y13.10 | → | Y13.116 | Y13.118 | Y13.120 | Y13.122 | Y13.124 | Y13.126 |
| Line14 | Y14.0 | Y14.2 | Y14.2 | Y14.6 | Y14.8 | Y14.10 | → | Y14.116 | Y14.118 | Y14.120 | Y14.122 | Y14.124 | Y14.126 |
| Line15 | Y15.0 | Y15.2 | Y15.4 | Y15.6 | Y15.8 | Y15.10 | → | Y15.116 | Y15.118 | Y15.120 | Y15.122 | Y15.124 | Y15.126 |

Figure 15B

SYSTEM AND METHOD FOR DOWNSIZING VIDEO DATA FOR MEMORY BANDWIDTH OPTIMIZATION

TECHNICAL FIELD

The present invention relates to the field of digital video. In particular, but not by way of limitation, the present invention discloses techniques for efficiently scaling down full-motion video.

BACKGROUND

Video generation systems within computer systems generally use a large amount of memory and a large amount of memory bandwidth. At the very minimum, a video display adapter within a computer system requires a frame buffer that stores a digital representation of the desktop image currently being rendered on the video display screen. The central processing unit (CPU) or graphics processing unit (GPU) of the computer system must access the frame buffer to change the desktop image in response to user inputs and the execution of application programs. Simultaneously, the entire frame buffer is read by the video display adapter at rates of 60 times per second or higher to render the desktop image in the frame buffer on a video display screen. The combined accesses of the CPU (or GPU) updating the image to display and the video display adapter reading out the image in order to render a video output signal use a significant amount of memory bandwidth.

In addition to those minimum requirements, there are other video functions of a computer system that may consume processing cycles, memory capacity, and memory bandwidth. For example, three-dimensional (3D) graphics, full-motion video, and graphical overlays may all need to be handled by the CPU (or GPU), the video memory system, and the video display adapter.

Many computer systems now include special three-dimensional (3D) graphics rendering systems that read information from 3D models and render a two-dimensional (2D) representation in the frame buffer that will be read by the video display adapter for display on the video display system. The reading of the 3D models and rendering of a two-dimensional representation may consume a very large amount of memory bandwidth. Thus, computer systems that will do a significant amount of 3D rendering generally have separate specialized 3D rendering systems that use a separate 3D memory area. Some computer systems use 'double-buffering' wherein two frame buffers are used. In double-buffering systems, the CPU generates one image in a frame buffer that is not being displayed while another frame buffer is being displayed on the video display screen. When the CPU completes the new image, the system switches from a frame buffer currently being displayed to the frame buffer that was just completed. This technique eliminates the effect of 'screen tearing' wherein an image is changed while being displayed.

Furthermore, the video output systems of modern computer systems generally need to display full-motion video. Full-motion video systems decode and display full-motion video clips such as clips of television programming or film on the computer display screen for the user. (This document will use the term 'full-motion video' when referring to such television or film clips to distinguish such full-motion video from the reading of normal desktop graphics for the generation of a video signal to display on a video display monitor.) Full-motion video is generally represented in digital form as computer files containing encoded video or an encoded digital video stream received from an external source.

To display digitally encoded full-motion video, the computer system must first decode the full-motion video to obtain a series of video image frames. Then the computer system needs to merge the full-motion video with desktop image data stored within the computer systems main frame buffer. Due to all of the processing steps required to decode, processing and resize full-motion video for display on a computer desktop, the output of full-motion video generally consumes a significant amount of memory capacity and memory bandwidth. However, since the ability to display of full-motion video is a now standard feature that is expected in all modern computer systems, computer system designers must design their computer systems to handle the display of full-motion video In a full personal computer system, there is ample CPU processing power, memory capacity, and memory bandwidth in order to perform all of the needed processing steps for rendering a complex composite desktop image that includes a window displaying a full-motion video. For example, the CPU may decode full-motion video stream to create video frames in a memory system, the CPU may render the normal desktop display screen in a frame buffer, and a video display adapter may then read the decoded full-motion video frames and main frame buffer to create a composite image. Specifically, the video display adapter, combines the decoded full-motion video frames with the desktop display image from the main frame buffer to generate a composite video output signal.

In small computer systems wherein the computing resources are much more limited the task of generating a video output display with advanced feature such as handling full-motion video can be much more difficult. For example, mobile telephones, handheld computer systems, netbooks, tablet computer systems, and terminal systems will generally have much less CPU processing power, memory capacity, and video display adapter resources than a typical personal computer system. Thus, in a small computer the task of combining a full-motion video stream with a desktop display to render a composite video display can be very difficult. It would therefore be very desirable to develop very efficient methods of handling complex display tasks such that complex displays can be output by the display systems in small computer systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 10C illustrates the data organization of a Cr chrominance macro block for a minimum coding unit (MCU) used within the motion-JPEG video encoding system.

FIG. 12A illustrates one possible format of rasterized luminance data ready for display.

FIG. 12B illustrates one possible format of rasterized chrominance data ready for display.

FIG. 14B illustrates the video pre-processor of FIG. 14A used within a computer video display system.

FIG. 15A illustrates 4 MCUs of luminance (Y) data in a rasterized data format.

FIG. 15B illustrates 8 MCUs of luminance (Y) data in a rasterized data format after a 50% horizontal downsizing.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to the True-Color and High-Color video modes, the teachings of the present disclosure can be used with other video modes. Furthermore, the present disclosure describes certain embodiments for use within thin-client terminal systems but the disclosed technology can be used in many other applications. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
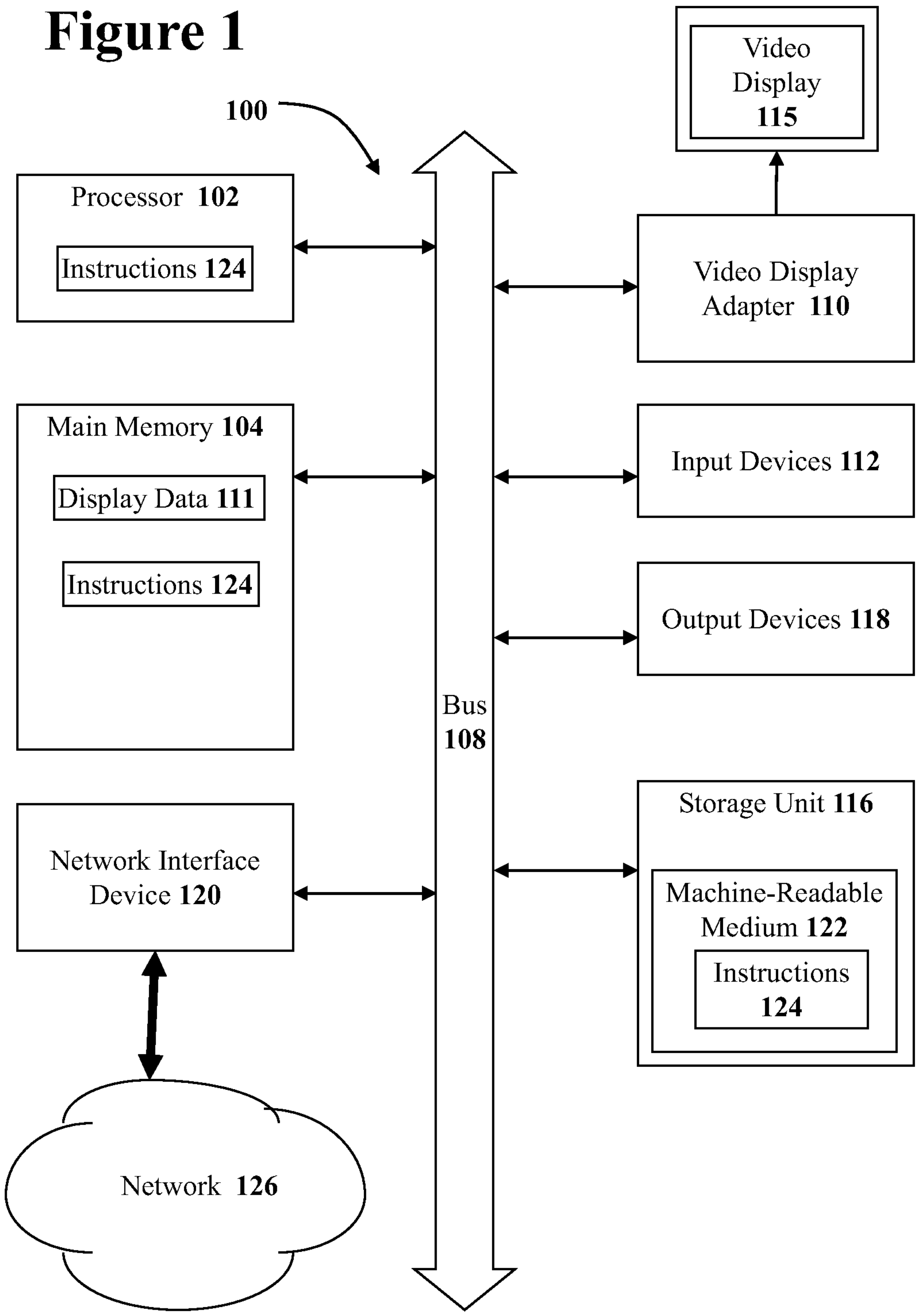
FIG. 1 illustrates a diagrammatic representation of machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a thin-client terminal system, a personal computer (PC), a tablet PC, a set-top box (STB), a Personal Digital Assistant (PDA), a cellular telephone, a web appliance, or any machine capable of displaying video and executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes one or more input devices 112. The input devices may include an alpha-numeric input device (e.g., a keyboard), a cursor control device (e.g., a mouse or trackball), a touch screen, or any other user input device. Similarly, the computer system may include one or more output devices 118 (e.g., a speaker), LEDs, a vibration device. A storage unit 116 functions as a non-volatile memory system. The storage unit 116 may be a disk drive unit, flash memory, read-only memory, battery backed-RAM, or any other system of providing non-volatile data storage.

The computer system 100 may also have a network interface device 120. The network interface device may couple to a digital network in a wired or wireless manner. Wireless networks may include WiFi, WiMax, cellular phone, networks, BlueTooth, etc. Wired networks may be implemented with Ethernet, a serial bus, a token ring network, or any other suitable wired digital network.

In many computer systems, a section of the main memory 104 is used to store display data 111 that will be accessed by the video display adapter 110 to generate a video signal. A section of memory that contains a digital representation of what the video display adapter 110 is currently outputting on the video display system 115 is generally referred to as a frame buffer. Some video display adapters store display data in a dedicated frame buffer located separate from the main memory. (For example, a frame buffer may reside within the video display adapter 110.) However, the present disclosure will primarily focus on computer systems that store a frame buffer within a shared memory system.

The storage unit 116 generally includes some type of machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100. Thus, the main memory 104 and the processor 102 may also be considered machine-readable media.

The instructions 124 may further be transmitted or received over a computer network 126 via the network interface device 120. Such transmissions may occur utilizing any one of a number of data transfer protocols such as the well known File Transport Protocol (FTP), the HyperText Transport Protocol (HTTP), or any other data transfer protocol.

Some computer systems may operate in a terminal mode wherein the system receives a full representation of display data 111 to be stored in the frame buffer over the network interface device 120. Such computer systems will decode the received display data and fill the frame buffer with the decoded display data 111. The video display adapter 110 will then render the received data on the video display system 115.

In addition, a computer system may receive a stream of encoded full-motion video for display or open a file with encoded full-motion video data. The computer system must decode the full-motion video data such that the full-motion video can be displayed. The video display adapter 110 must then merge that full-motion video data with display data 111 in the frame buffer to generate a final display signal for the video display system 115.

In FIG. 1, the machine-readable medium 122 shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Computer Display Systems

The video display data for a computer system is generally made up of a matrix of individual pixels (picture elements). Each pixel is an individual "dot" on the video display system. The resolution of a video display system is generally defined as a two-dimensional rectangular array defined by a number of columns and a number of rows. The rectangular array of pixels is displayed on a video display device. For example, a video display monitor with a resolution of 800 by 600 will display a total of 480,000 pixels. Most modern computer systems have video display adapters that can render video in several different display resolutions such that the computer system can take advantage of the specific resolution capabilities of the particular video display monitor coupled to the computer system.

Most modern computer systems have color display systems. In a computer system with a color display system, each individual pixel can be any different color that can be defined by the pixel data and generated by the display system. Each individual pixel is represented in the frame buffer of the memory system with a digital value that specifies the pixel's color. The number of different colors that may be represented in a frame buffer is limited by the number of bits assigned to each pixel. The number of bits per pixel is often referred to as the color-depth.

A single bit per pixel frame buffer would only be capable of representing two different colors (generally black and white). A monochrome display would require a small number of bits to represent various shades of gray.

With colored display systems, each pixel is generally defined using a number of bits for defining red, green, and blue (RGB) colors that are combined to generated a final output color. In a "High Color" display system, each pixel is defined with 16 bits of color data. The 16 bits of color data generally represent 5 bits of red data, 6 bits of green data, and 5 bits of blue data. With a “True Color” display system, each pixel is defined with 24 bits of data. Specifically, the 24 bits of data represent 8 bits of Red data, 8 bits of Green data, and 8 bits of Blue data. Thus, True Color mode is synonymous with “24-bit” mode, and High Color “16-bit” mode. Due to reduced memory prices and the ability of 24-bit (True Color) to convincingly display any image without much noticeable degradation, most computer systems now use 24 bit “True Color” display systems. Some video systems may also use more than 24 bits per pixel wherein the extra bits are used to denote levels of transparency such that multiple depths of pixels may be combined.

To display an image on a video display system, the video display adapter of a computer system fetches pixel data from the frame buffer, interprets the color data, and then generates an appropriate video output signal that is sent to a display device such as a liquid crystal display (LCD) panel. Only a single frame buffer is required to render a video display. However, more than one frame buffer may be present in a computer system memory depending on the application.

In a personal computer system, the video adapter system may have a separate video frame buffer that is in a dedicated video memory system. The video memory system may be designed specifically for the task of handling video display data. Thus, in most personal computers the rendering of a video display can be handled easily. However, in small computer systems such as mobile telephones, handheld computer systems, netbooks, thin-client terminal systems, and other small computer systems the computing resources tend to be much more limited. The computing resources may be limited due to cost, limited battery power, heat dissipation, and other reasons. Thus, the task of generating a high-quality video display in a computer system with limited computing resources can be much more difficult. For example, a small computer system will generally have less CPU power, less memory capacity, less memory bandwidth, no dedicated GPU, and less video display adapter resources than are present in a typical personal computer system.

In a small computer system, there is often no separate memory system for the video display system. Thus, the video generation system must share the same memory resources as the rest of the small computer system. Since a video generation system must continually read the entire frame buffer from the shared memory system at high rate (generally more than 60 times per second) and all the other memory users share the same memory system, the memory bandwidth (the amount of data that can be read out of the memory system per unit time) can become a very scarce resource that limits the functionality of the small computer system. It is therefore very important to devise methods of reducing the memory bandwidth requirements of the various memory users within the small computer system. Since the video display system may consume the largest amount of memory bandwidth (by constantly reading out data to refresh the video display monitor), it is obvious to focus on the video display system when attempting to optimize memory usage.

Thin-Client Terminal System Overview

As set forth in the preceding sections, many different types of small computer systems can benefit from methods disclosed in this document that reduce the memory bandwidth requirements in the small computer system. For example, any other small computer system that renders full-motion video such as mobile telephones, netbooks, slate computers, or other small systems may use the teachings of this document. However, this disclosure will be disclosed with reference to an implementation within a small computer terminal system known as a thin-client terminal system.

A thin-client terminal system is an inexpensive dedicated computer system that is designed to receive user input then transmit that input to a remote computer system and receive output information from that remote computer system to present to the user. For example, a thin-client terminal system may transmit mouse movements and alpha-numeric keystrokes received from a user to a remote server system. Similarly, the thin-client system may receive encoded video display output data from the remote server system and display that video display output data on a local video display system. In general, a thin-client terminal system does not execute user application programs on the processor of a dedicated thin-client terminal system. Instead, the thin-client terminal system executes user applications on the remote server system and displays the output data locally.

Modern thin-client terminal systems strive to provide all of the standard user interface features that personal computers users have come to expect from a computer system. For example, modern thin-client terminal systems includes high-resolution graphics capabilities, audio output, and cursor control (mouse, trackpad, trackball, etc.) input that personal computer users have become accustomed to using. To implement all of these user interface features, a modern thin-client terminal system generally includes a small dedicated computer system that implements all of the tasks associated with displaying video output and accepting user input. For example, the thin-client terminal system receives encoded display information, decodes the encoded display information, places the decoded display information in a frame buffer, and then renders a video display based on the information in the frame buffer. Similarly, the thin-client terminal system receives input from the local user, encodes the user input, and then transmits the encoded user input to the remote server system.

An Example Thin-Client System

Figure 2:
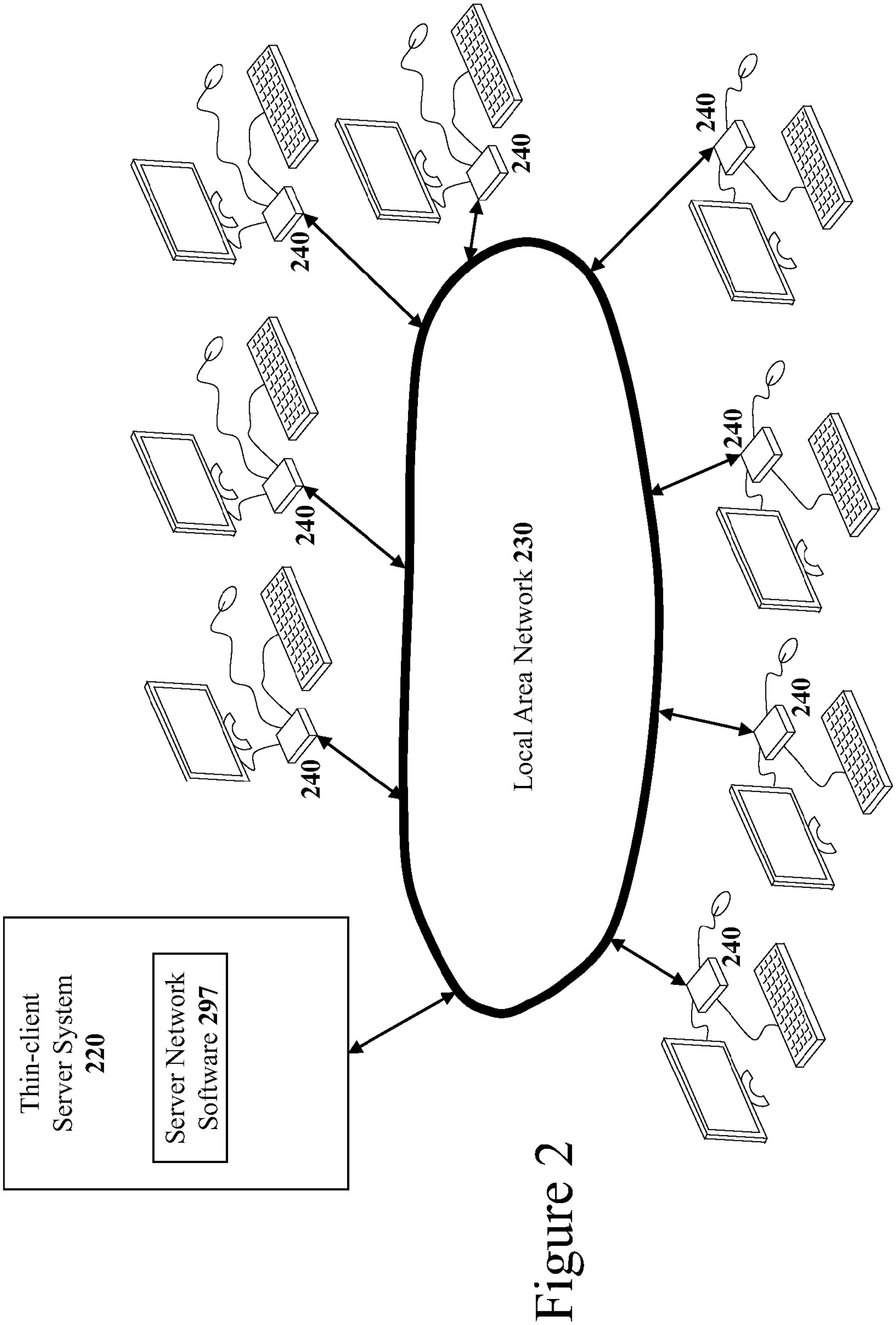
FIG. 2 illustrates a high-level block diagram of a single thin-client server computer system supporting multiple individual thin-client terminal systems using a local area network.

FIG. 2 illustrates a conceptual diagram of a thin-client environment. Referring to FIG. 2, a single thin-client server system 220 provides computer processing resources to many individual thin-client terminal systems 240. User application programs execute on the server system 220 and the thin-client terminal systems 240 are only used for displaying output and receiving user input.

In the embodiment of FIG. 2, each of the individual thin-client terminal systems 240 is coupled to the thin-client server system 220 using local area network 230 as a bi-directional communication channel. The individual thin-client terminal systems 240 transmit user input (such as key strokes and mouse movements) across the local area network 230 to the thin-client server system 220. Similarly, the thin-client server system 220 transmits output information (such as video and audio) across the local area network 230 to the individual thin-client terminal systems 240.

Figure 3:
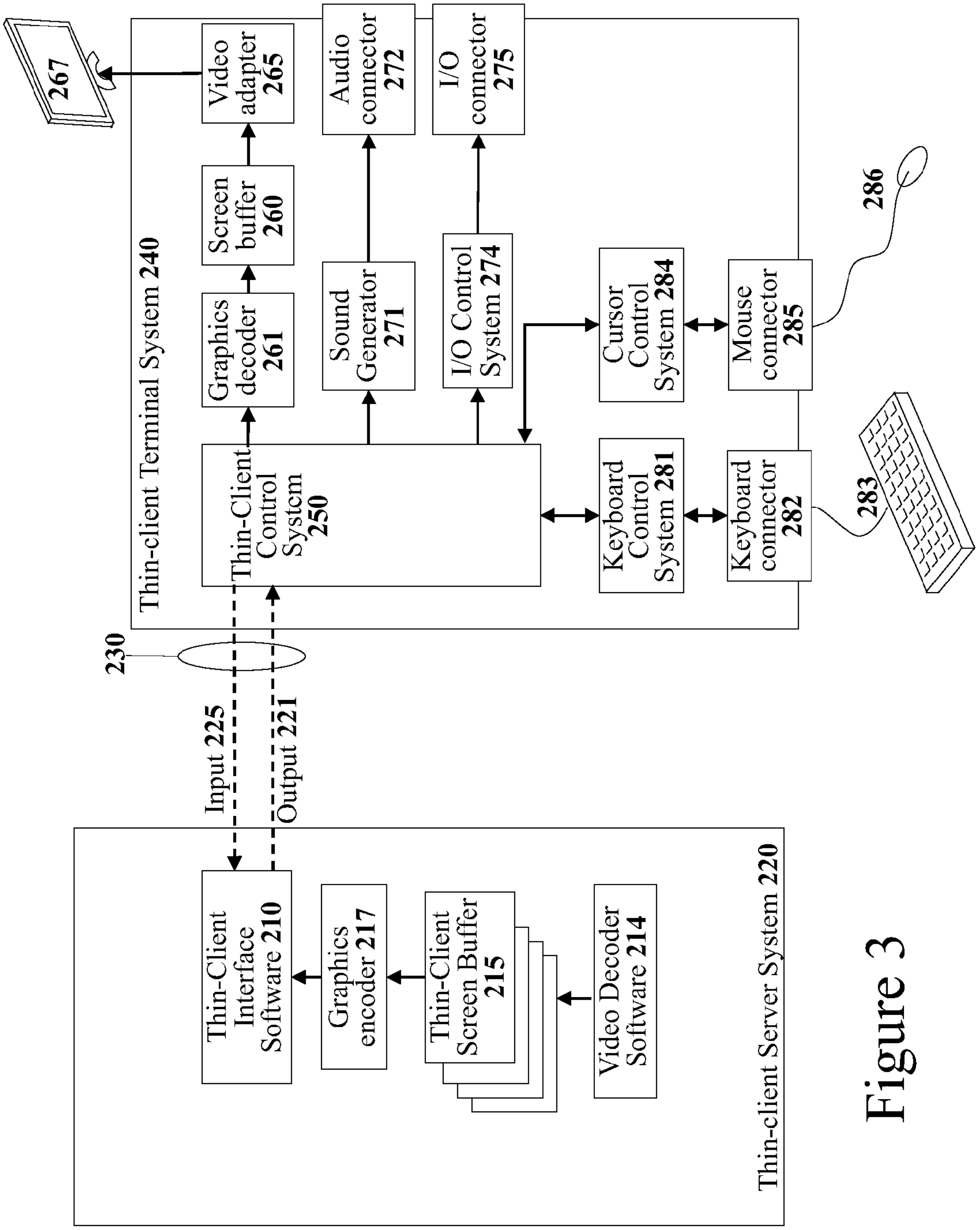
FIG. 3 illustrates a block diagram of a thin-client terminal system coupled to a thin-client server computer system.

FIG. 3 illustrates a high-level block diagram of a basic embodiment of one (of possibly many) thin-client terminal system 240 coupled to thin-client server system 220. The thin-client terminal system 240 and thin-client server system 220 are coupled with a bi-directional digital communications channel 230 that may be a serial data connection, an Ethernet connection, or any other suitable bi-directional digital communication means such as the local area network 230 of FIG. 2.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead of the inexpensive thin-client terminal system 240. Keeping the costs low can be achieved since the thin-client terminal system 240 will not need the full computing resources or software of a personal computer system. Those features will be provided by the thin-client server system 220 that will interact with the thin-client terminal system 240.

Referring back to FIG. 3, the thin-client terminal system 240 provides both visual and auditory output using a high-resolution video display system and an audio output system. The high-resolution video display system consists of a graphics update decoder 261, a frame buffer 260, and a video adapter 265. When changes are made to a representation of the thin-client terminal system's display in thin-client screen buffer 215 within the server system 220, the graphics encoder 217 identifies those changes to the thin-client screen buffer 215, encodes the changes to the screen buffer, and then transmits the screen buffer changes to the thin-client terminal system 240.

The thin-client terminal system 240 receives the screen buffer changes and applies the changes to a local frame buffer. Specifically, the graphics update decoder 261 decodes graphical changes made to the associated thin-client screen buffer 215 in the server 220 and applies those same changes to the local screen buffer 260 thus making screen buffer 260 an identical copy of the bit-mapped display information in thin-client screen buffer 215. Video adapter 265 reads the video display information out of screen buffer 260 and generates a video display signal to drive display system 267.

From an input perspective, thin-client terminal system 240 allows a terminal system user to enter both alpha-numeric (keyboard) input and cursor control device (mouse) input that will be transmitted to the thin-client computer system 220. The alpha-numeric input is provided by a keyboard 283 coupled to a keyboard connector 282 that supplies signals to a keyboard control system 281. The thin-client control system 250 encodes keyboard input from the keyboard control system 281 and sends that keyboard input as input 225 to the thin-client server system 220. Similarly, the thin-client control system 250 encodes cursor control device input from cursor control system 284 and sends that cursor control input as input 225 to the thin-client server system 220. The cursor control input is received through a mouse connector 285 from a computer mouse 285 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 3 includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server system 220 is equipped with multi-tasking software for interacting with multiple thin-client terminal systems 240 wherein each thin-client terminal system executes within its own terminal "session". As illustrated in FIG. 3, thin-client interface software 210 in thin-client server system 220 supports the thin-client terminal system 240 as well as any other thin-client terminal systems coupled to thin-client server system 220. The thin-client server system 220 keeps track of the terminal session for each thin-client terminal system 240. One part of maintaining each terminal session is to maintain a thin-client screen buffer 215 in the thin-client server system 220 for each active thin-client terminal system 240. The thin-client screen buffer 215 in the thin-client server system 220 contains representation of what is displayed on the associated thin-client terminal system 240.

Transporting Video Information to Terminal Systems

The bandwidth required to transmit an entire high-resolution video frame buffer from a server to a terminal at full video display refresh speeds is prohibitively large. Thus video compression systems are used to greatly reduce the amount of information needed to recreate a video display on a terminal system at a remote location. In an environment that uses a shared communication channel to transport the video display information (such as the computer network 230 in the thin-client environment of FIG. 2), very large amounts of display information transmitted to each thin-client terminal system 240 can adversely impact the computer network 230. If the video display information for each thin-client terminal is not encoded efficiently enough, the large amount of display information may overwhelm the network 230 thus not allowing the system to function at all.

When the application programs running on the thin-client server system 220 for the thin-client terminal systems 240 are typical office software applications (such as word processors, databases, spreadsheets, etc.) then there are many simple techniques that can be used to significantly decrease the amount of display information that must be delivered over the computer network 230 to the thin-client terminal systems 240 while maintaining a high quality user experience for each terminal system user. For example, the thin-client server system 220 may only send display information across the computer network 230 to a thin-client terminal system 240 when the display information in the thin-client screen buffer 215 for that specific thin-client terminal system 240 actually changes. In this manner, when the display for a thin-client terminal system is static (no changes are being made to the thin-client screen buffer 215 in the thin-client server system 220), then no display information needs to be transmitted from the thin-client server system 220 to that thin-client terminal system 240. Small changes (such as a few words being added to a document in a word processor or the pointer being moved around the screen) will require only small updates to be transmitted.

As long as the software applications run by the users of thin-client terminal systems 240 do not change the display screen information very frequently, then the thin-client system illustrated in FIGS. 2 and 3 will work adequately. However, if some thin-client terminal system users run software applications that rapidly change the thin-client terminal's display screen (such as viewing full-motion video), the volume of network traffic over the computer network 230 will increase greatly due to the much larger amounts of graphical update messages that must be transmitted. If several thin-client terminal system 240 users run applications that display full-motion video then the bandwidth requirements for the communication channel 230 can become quite formidable such that data packets may be dropped. Dropped packets will greatly decrease the user experience.

Referring to FIG. 3, it can be shown that displaying full-motion video in thin-client environment of FIG. 3 is handled very inefficiently. To display full-motion video (FMV), video decoder software 214 on the thin-client server system 220 will access a video file or video stream and then render video frames into a thin-client screen buffer 215 associated with the thin-client terminal system 240 that requested the full-motion video. The graphics encoder 217 will then identify changes made to the thin-client screen buffer 215, encode those changes, and then transmit those changes through thin-client interface software 210 to the thin-client terminal system 240. Thus, the thin-client server system 220 decodes the full-motion video with video decoder 214 and then re-encodes the full-motion video (as the FMV is represented within screen buffer 215) with graphics encoder 217 before sending it to the thin-client terminal system 240. In a system designed for relatively static display screens, such a system for handling full-motion video is inefficient.

To create a more efficient system for handling full-motion video in a thin-client environment, a related patent application titled "System And Method For Low Bandwidth Display Information Transport" disclosed a system wherein areas of full-motion video information to be displayed on a thin-client transmitted to the thin-client system in an encoding format specifically designed for encoding full-motion video. (That related U.S. patent application Ser. No. 12/395,152 filed Feb. 27, 2009 is hereby incorporated by reference in its entirety.) A high-level block diagram of this more efficient system is illustrated in FIG. 4.

Figure 4:
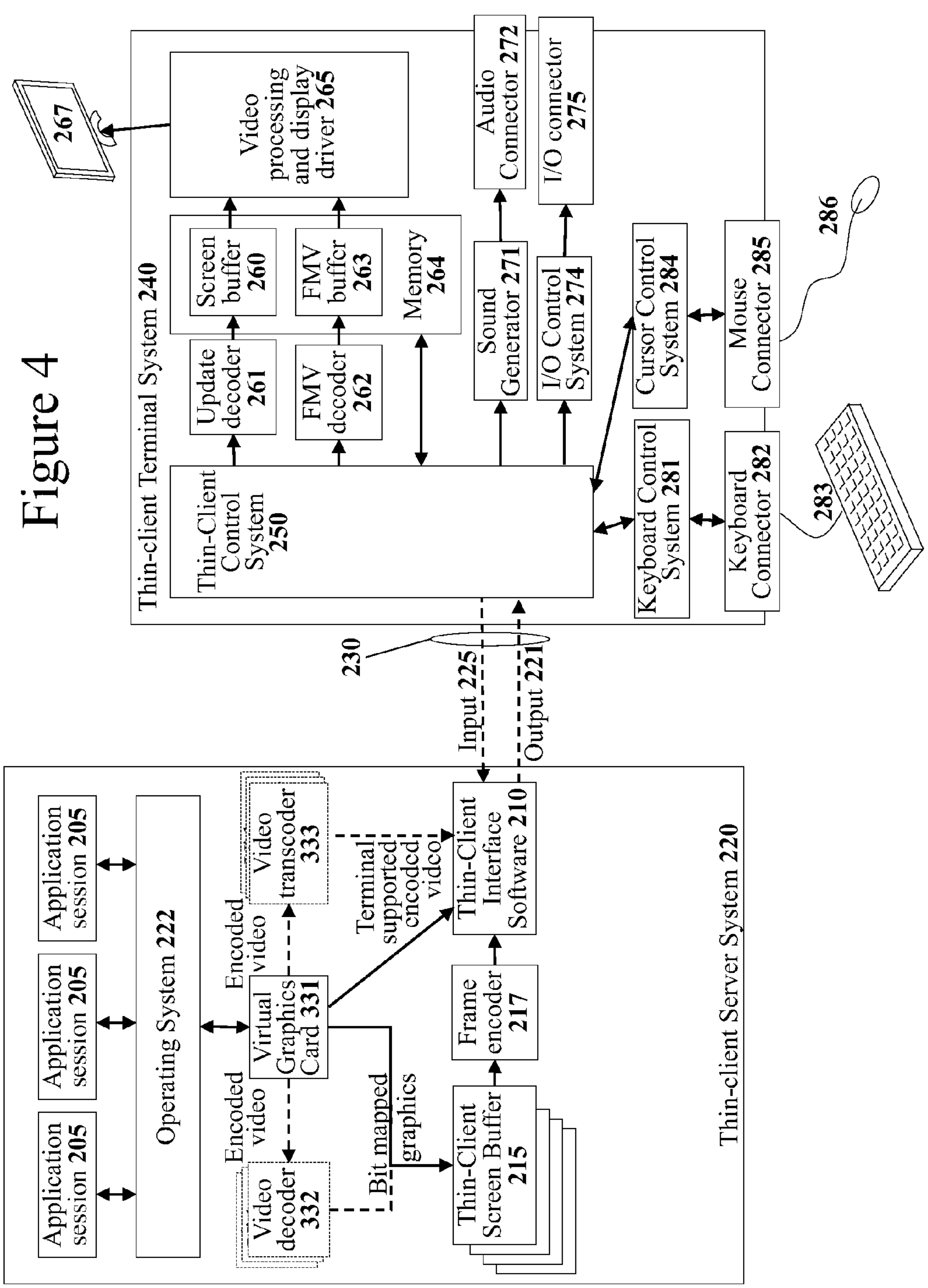
FIG. 4 illustrates a thin-client server computer system and thin-client terminal system that support higher quality video stream decoding locally within the thin-client terminal system.

Referring to FIG. 4, a thin-client server system 220 and a thin-client terminal system 240 are displayed. The thin-client terminal system 240 of FIG. 4 is similar to the thin-client terminal system 240 of FIG. 3 with the addition of a full-motion video decoder 262. The full-motion video decoder 262 may receive a full-motion video stream from thin-client control system 250, decode the full-motion video stream, and render the decoded video frames in a full-motion video buffer 263 in a shared memory system 264. The shared memory system 264 may be used for many different memory tasks within thin-client terminal system 240. In the example of FIG. 4, the shared memory system 264 is used to store the decoded full-motion video in full-motion video buffer 263, video display information in a display screen frame buffer 260, and other digital information from the thin-client control system 250.

The video transmission system in the thin-client server computer system 220 of FIG. 4 must also be modified in order to transmit encoded full-motion video streams directly to the thin-client terminal system 240. Referring to the thin-client server system 220 of FIG. 4, the video system may include a virtual graphics card 331, thin-client screen buffers 215, and graphics encoder 217. Note that FIG. 4 illustrates other elements that may also be included such as full-motion video decoders 332 and full-motion video transcoders 333. For more information on those elements, the reader should refer to U.S. Patent application titled "System And Method For Low Bandwidth Display Information Transport" having Ser. No. 12/395,152 filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 that is supported by the thin-client server system 220. The responsibility of the virtual graphics card 331 is to output either bit-mapped graphics to be placed into the appropriate thin-client screen buffer 215 for a thin-client terminal system 240 or to output an encoded full-motion video stream that is supported by the full-motion video decoder 262 within the thin-client terminal system 240.

The full-motion video decoders 332 and full-motion video transcoders 333 within the thin-client server system 220 may be used to support the virtual graphics card 331 in handling full-motion video streams. Specifically, the full-motion video decoders 332 and full-motion video transcoders 333 help the virtual graphics card 331 handle encoded full-motion video streams that are not natively supported by the digital video decoder 262 in thin-client terminal system. The full-motion video decoders 332 are used to decode full-motion video streams and place the video data thin-client screen buffer 215 (in the same manner as the system of FIG. 3). The full-motion video transcoders 333 are used to convert from a first digital full-motion video encoding format into a second digital full-motion video encoding format that is natively supported by a video decoder 262 in the target thin-client terminal system 240.

The full-motion video transcoders 333 may be implemented as the combination of a digital full-motion video decoder for decoding a first digital video stream into individual decoded video frames, a frame buffer memory space for storing decoded video frames, and a digital full-motion video encoder for re-encoding the decoded video frames into a second digital full-motion video format supported by the video decoder 262 in the target thin-client terminal system 240. This enables the transcoders 333 to use existing full-motion video decoders on the personal computer system. Furthermore, the transcoders 333 could share the same full-motion video decoding software used to implement video decoders 332. Sharing code would reduce licensing fees.

The final output of the video system in the thin-client server system 220 of FIG. 4 is a set of graphics update messages from the graphics frame buffer encoder 217 and encoded full-motion video stream (when a full-motion video is being displayed) that is supported by the video decoder 262 in the target thin-client terminal system 240. The thin-client interface software 210 outputs the graphics update messages and full-motion video stream information across communication channel 230 to the target thin-client terminal system 240.

In the thin-client terminal system 240, the thin-client control system 250 will distribute the received output information (such as audio information, frame buffer graphics, and full-motion video streams) to the appropriate subsystem in the thin-client terminal system 240. Thus, graphical frame buffer update messages will be passed to the graphics frame buffer update decoder 261 and the streaming full-motion video information will be passed to the full-motion video (FMV) decoder 262. The graphics frame buffer update decoder 261 will decode the graphics update and then apply the graphics update to the thin-client terminal's screen frame buffer 260 appropriately. The full-motion video decoder 262 will decode incoming digital full-motion video stream and write the decoded video frames into a full-motion video buffer 263.

In the embodiment of FIG. 4, the terminal's screen frame buffer 260 and the full-motion video buffer 263 reside in the same shared memory system 264. The video processing and display driver 265 then reads the display information out of the terminal's screen frame buffer 260 and combines that desktop display with full-motion video information read from the full-motion video buffer 263 to render a final output display signal for display system 267. As is apparent in FIG. 4, the shared memory system 264 is heavily taxed by the video display system alone. Specifically, the graphics update decoder 261, the full-motion video decoder 262, and the video processing and display driver 265 all access the shared memory system 264.

Combining Full-Motion Video with Frame Buffer Graphics

Figure 5:
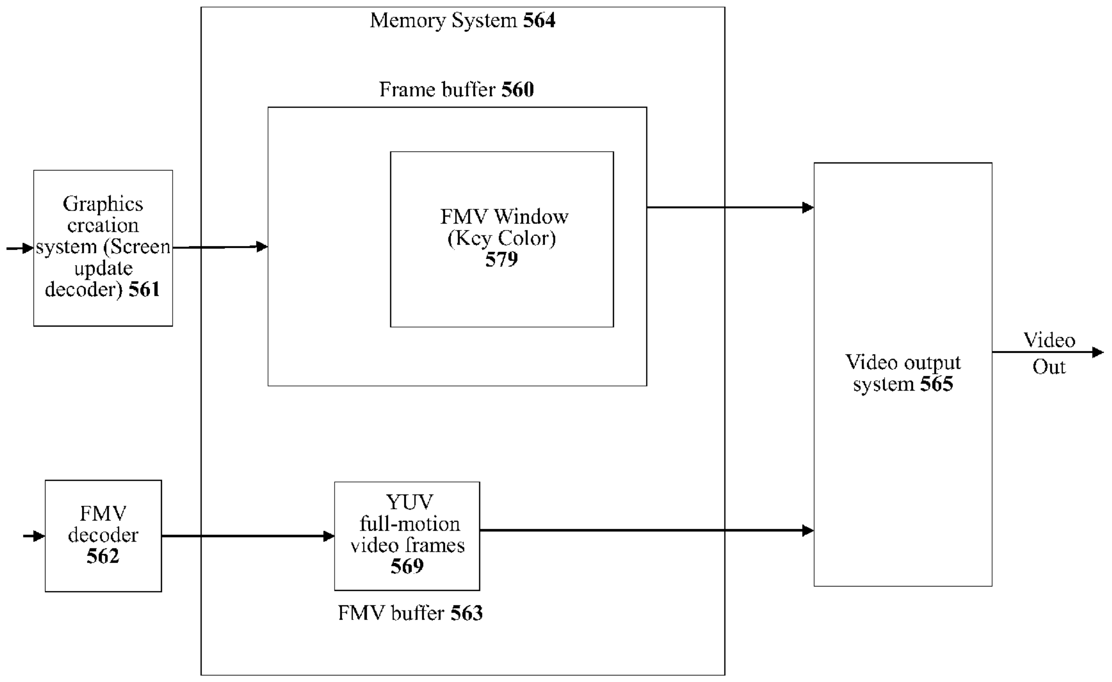
FIG. 5 illustrates a block diagram of a video output system that reads data from a frame buffer then replaces designated key-color areas of the frame buffer with data read from a full-motion video buffer.

The task of combining a typical display frame buffer (such as screen frame buffer 260) with full-motion video information (such as full-motion video buffer 263) may be performed in many different ways. One common method is to place a 'key color' in sections of the desktop display frame buffer where the full-motion video is to be displayed on the desktop display. The video output system then reads the desktop display frame buffer and replaces the key color areas of the desktop display frame buffer with full-motion video. FIG. 5 illustrates a block diagram of this type of arrangement.

Referring to FIG. 5, a graphics creation system 561 (such as the screen update decoder 261 in FIG. 4) renders a digital representation of a desktop display screen in a display screen frame buffer 560. In an area where a user has opened up a window to display full-motion video, the graphics creation system 561 has created a full-motion video window 579 that is filled with a specified key color.

In addition to the frame buffer display information, the system also has a full-motion video decoder 562 that decodes full-motion video into a full-motion video buffer 563. In this particular embodiment, the decoded video consists of YUV encoded video frames. A video output system 565 reads the both the data in the frame buffer 560 and the YUV video frame data 569 in the FMV buffer 563. The video output system 565 then replaces the key color of the full-motion video window area 579 of the frame buffer with pixel data generated from the YUV video frame data in the FMV buffer 563 to generate a final video output signal.

The raw full-motion video information output by a full-motion video decoder 562 generally cannot be used to directly generate a video output signal. The raw decoded full-motion video information is not within a format that can easily be merged with the desktop display information in the frame buffer 560.

A first reason that the decoded full-motion video information cannot be used directly is that the native resolution (horizontal pixel size by vertical pixel size) of the raw decoded full-motion video information 563 will probably not match the size of the full-motion video window 579 that the user has created to display the full-motion video. Thus, the full-motion video information may need to be rescaled from an original native resolution to a target resolution that will fit properly within the full-motion video window 579.

A second reason that the raw decoded full-motion video information 563 cannot be used directly is that full-motion video information is generally represented in a compressed YUV color space format. For example, the 4:2:0 YUV color space format is commonly used in many digital full-motion video encoding systems. As set forth earlier, the frame buffer in a typical computer system uses a red, green, and blue (RGB) pixel format. Thus, the raw decoded full-motion video information must be processed with a color conversion function to change the YUV encoded color pixel data into RGB encoded color pixel data.

Figure 6:
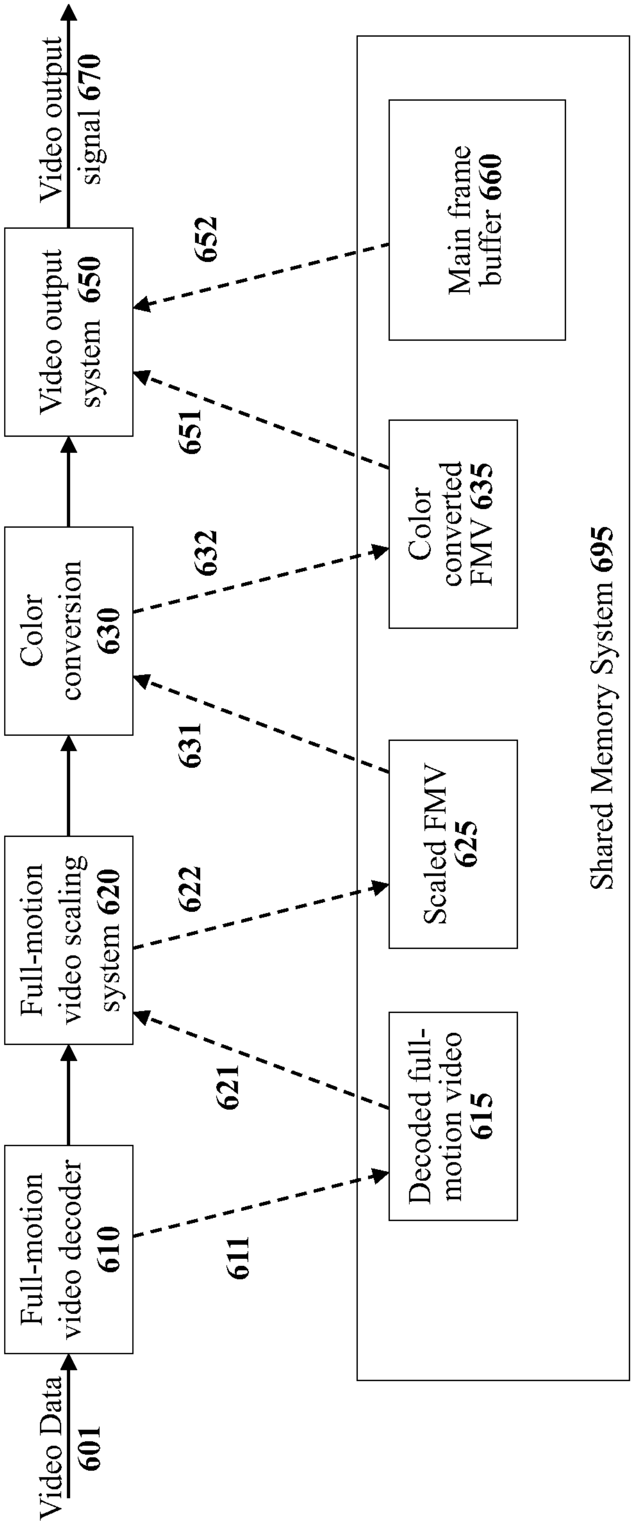
FIG. 6 illustrates a conceptual diagram describing all the processing that must be performed to display a full-motion video within full-motion video window on a desktop display.

All of this processing of full-motion video information can significantly tax the resources of a small computer system. FIG. 6 illustrates a conceptual diagram describing all the processing that must be performed to prepare the full-motion video information for output. The top portion of FIG. 6 illustrates a flow diagram describing processing steps that may be performed. The bottom portion of FIG. 6 illustrates the data that may be stored in memory during each processing step.

Initially, incoming full-motion video (FMV) data 601 is received by a full-motion video decoder 610. The full-motion video decoder 610 decodes the encoded video stream and stores (along line 611) the raw decoded full-motion video information 615 into a memory system 695. This raw decoded full-motion video information 615 generally consists of video image frames stored in some native resolution using a YUV color space encoding format. As set forth above, this raw decoded full-motion video information 615 cannot be displayed using a typical RGB computer display system and thus needs to be processed.

In a computer environment that allows multiple application windows to be displayed simultaneously, the full-motion video information will need to be scaled to fit within the application that the user has created for the full-motion video application. Thus, a video scaling system 620 will read (along line 621) the decoded YUV full-motion video information 615 from the shared memory system 695 at the video source frame rate. If a 4:2:0 YUV encoding system is used, the bandwidth required for this step is Hv*Vv*f*1.5 bytes/sec where Hv is the native horizontal resolution, Vv is the native vertical resolution, and f is the frame rate of the source full-motion video data. (The value of 1.5 byes represents the amount of bytes per pixel in a 4:2:0 YUV encoding.)

The video scaling system 620 then adjusts the resolution of the full-motion video to fit within boundaries of the full-motion video window created by the user. An inefficient scaling system might perform the scaling in two stages that each require reading and writing from the memory system 695. A first stage would read the full-motion video data and then write back horizontally scaled full-motion video data. A second stage would read the horizontally scaled full-motion video data and then write back full-motion video data 625 that is both horizontally and vertically scaled. This document will assume a video scaling system 620 that scales the video in both dimensions with a single read 621 and a single write 622 of the full-motion video frame After completing the scaling, the video scaling system 620 will write (along line 622) the scaled YUV full-motion video information 625 back into the shared memory system 695 at the same (video source) frame rate. The memory bandwidth required for this write-back step is Hw*Vw*f*1.5 bytes/sec where Hw is horizontal resolution, Vw is the vertical resolution of the full-motion video window, and f is the full-motion video frame rate. (Again, the value of 1.5 byes represents the amount of bytes per pixel in a 4:2:0 YUV encoding.)

To merge the full-motion video with the desktop display graphics and display it with the computer systems RGB based system, a color conversion system must convert the full-motion video from its non RGB format (4:2:0 YUV in this example) into an RGB format. Thus, the color conversion system 630 will read (along line 631) the scaled YUV full-motion video information 625 from the shared memory system 695, convert the pixel colors to RGB format, and write (along line 632) the color converted full-motion video data 635 back into the shared memory system 695. In a True Color video system that uses 3 bytes per pixel, the memory bandwidth requirements for this color conversion are:

$$\text{Read}=Hw*Vw*f*1.5\text{ bytes/sec}$$

$$\text{Write}=Hw*Vw*f*3\text{ bytes/sec}$$

$$\text{Total}=Hw*Vw*f*4.5\text{ bytes/sec}$$

Finally, the scaled and RGB formatted full-motion video 635 must be written read by the video output system 650 and merged with the desktop display image from the main frame buffer 660. To perform this merging, the video output system 650 reads both the RGB formatted full-motion video 635 (along line 651) and desktop display image from the main frame buffer 660 (along line 652) from the memory system 695 at a refresh rate R required by the display monitor. (The refresh rate R will typically be larger than the source video frame rate f.) The video output system 650 may then use a key color system to multiplex together the two data streams and generate a final video output signal 670. For a computer display system with a horizontal resolution of Hd and a vertical resolution of Vd, the bandwidth requirements for this final processing stage are:

Main frame buffer data read=$Hd*Vd*R*3$ bytes/sec

FMV data read=$Hw*Vw*R*3$ bytes/sec

Total=($Hw*Vw*R*3$ bytes/sec)+($Hd*Vd*R*3$ bytes/sec)

In a worst-case scenario where the user has expanded the full-motion video window to fill the entire display screen (a full-motion video window resolution of Hd by Vd), the total bandwidth required will be 2*Hd*Vd*R*3 bytes/sec. Excluding the writing of the full-motion video data into the shared memory system, the total memory bandwidth requirement for the worst-case scenario (a full display screen sized full-motion video window) becomes:

Total Sum=$Hv*Vv*f*1.5+Hd*Vd*f*1.5+Hd*Vd*f*4.5+Hd*Vd*R*6$

Total Sum=$Hv*Vv*f*1.5+Hd*Vd*6*(f+R)$

Such a large amount of memory bandwidth usage will stress most memory systems. Within a small computer system with limited resources, such a large amount of memory bandwidth is unacceptable and must be reduced. Other types of systems may experience the same problem. For example, a system that supports multiple display systems from a single shared memory (such as a terminal multiplier) will also have difficulties with memory bandwidth. In a multiple user (or display) system where there are N users (or displays) sharing the same memory and having separate video paths, the total sum of memory bandwidth usage becomes: N*(Hv*Vv*f*1.5+Hd*Vd*6*(f+R)). It would likely be impractical to construct such a memory system.

Combining Video Processing Steps

Various different methods may be employed to reduce the memory bandwidth requirements for such a display system. One technique would employ a pipelined video processing system that performs multiple video processing steps with a single pipeline processing unit. Such a pipelined processing system would thus greatly reduce the amount of memory bandwidth required since the intermediate results would not be stored in the main memory system.

Figure 7A:
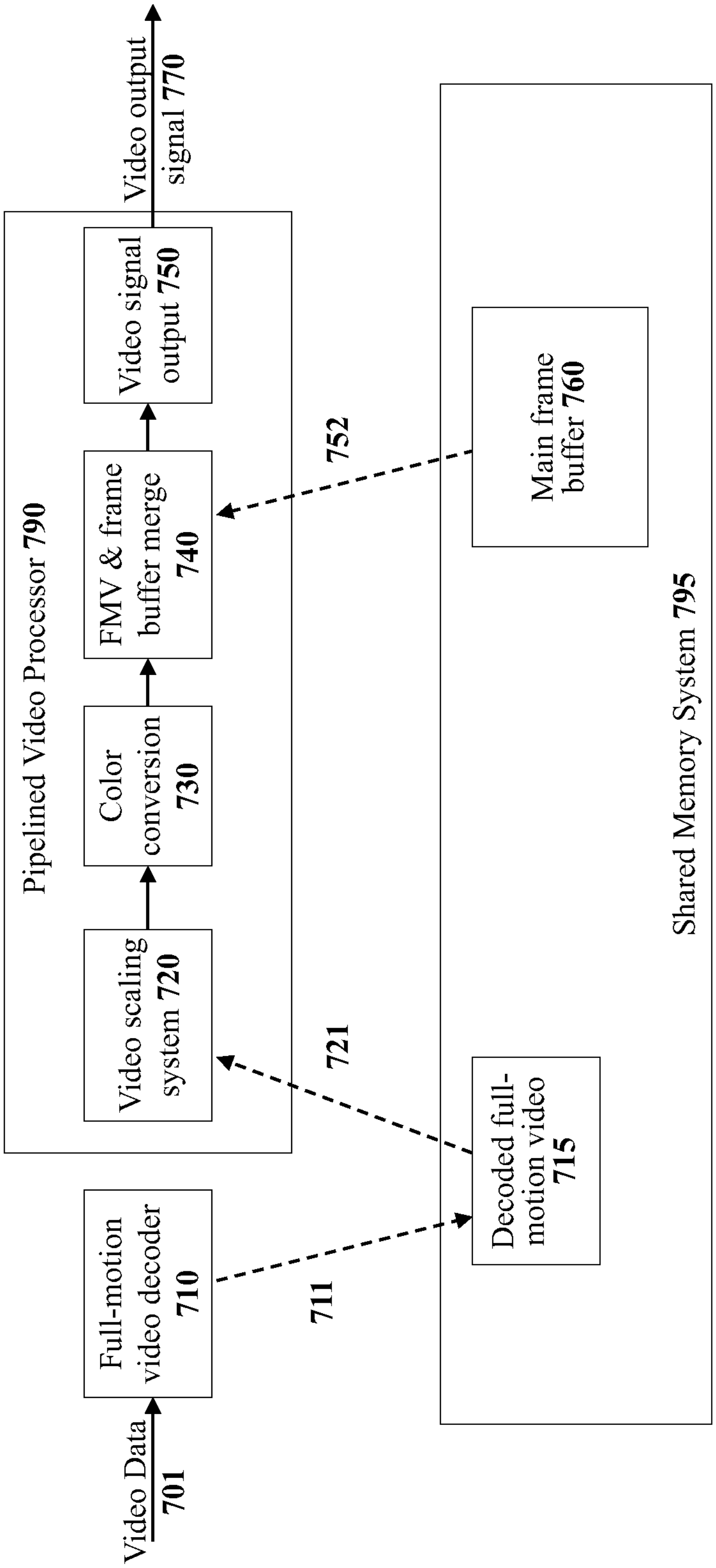
FIG. 7A illustrates a pipelined video processor that processes full-motion video in a pipelined manner.

FIG. 7A illustrates an example of a system containing such a pipelined video processor 790. Initially the pipelined video processor 790 of FIG. 7A is the same as the system of FIG. 6 since the decoded full-motion video information 715 is read into a scaling system 720. However, the subsequent video processing steps are then performed internally in a pipelined manner. In a pipelined system, the intermediate results from each processing stage are stored in smaller internal memory buffers between the processing stages.

The scaling system 720 scales incoming full-motion video data and stores the scaled results in a memory buffer (not shown) before the color conversion stage 730. Note that the results stored in the memory buffer are generally not a full video image frame. The intermediate results may vary from a few pixels to a few rows of video data.

The color conversion stage 730 converts the pixel color space into the RGB used by the video output system and then stores intermediate results (fully processed video data) in a memory buffer (not shown) before a full-motion video and frame buffer merge stage 740. The full-motion video and frame buffer merge stage 740 then reads the fully processed full-motion video data and merges it with the desktop graphics information read from the main frame buffer 760 in the shared memory 795. The merged data is then used to drive a video signal output system 750.

The pipelined video processor 790 illustrated in FIG. 7A may be implemented in many different manners. One possible implementation is disclosed in the U.S. provisional patent application "SYSTEM AND METHOD FOR EFFICIENTLY PROCESSING DIGITAL VIDEO" filed on Oct. 2, 2009, which is hereby incorporated by reference. The use of a pipelined video processor 790 greatly reduces memory bandwidth consumption since intermediate results are all stored in internal memory buffers such that the shared memory system 795 is only accessed to obtain source data.

In the pipelined video processor 790 disclosed in FIG. 7A, the decoded YUV full-motion video information 615 must be read (along line 721) from the shared memory system 795 at the full display system refresh rate instead of the (typically slower) source video frame rate since the final video output signal 770 is at the full video refresh rate. However, the reading of the color converted full-motion video information 635 at the display refresh rate (illustrated in FIG. 6 as line 651) is eliminated, so this is not a net increase. Thus, the pipelined video processor 790 eliminates all of the memory accesses along lines 621, 622, 631, and 632 illustrated in FIG. 6.

As set forth above, the pipelined video processor 790 of FIG. 7A greatly reduces the memory bandwidth requirements from the shared memory system 795 in comparison to the video generation system of FIG. 6. For the worst-case situation, a full-motion video window that has been expanded to fill the entire screen, the bandwidth calculation now becomes:

FMV read at a rate of monitor refresh=$Hv*Vv*R*1.5$ bytes/sec

Frame buffer read from memory=$Hd*Vd*R*3$ bytes/sec

Grand Total per user=$Hv*Vv*R*1.5+Hd*Vd*R*3=1.5R*(Hv*Vv+2*Hd*Vd)$

Figure 7B:
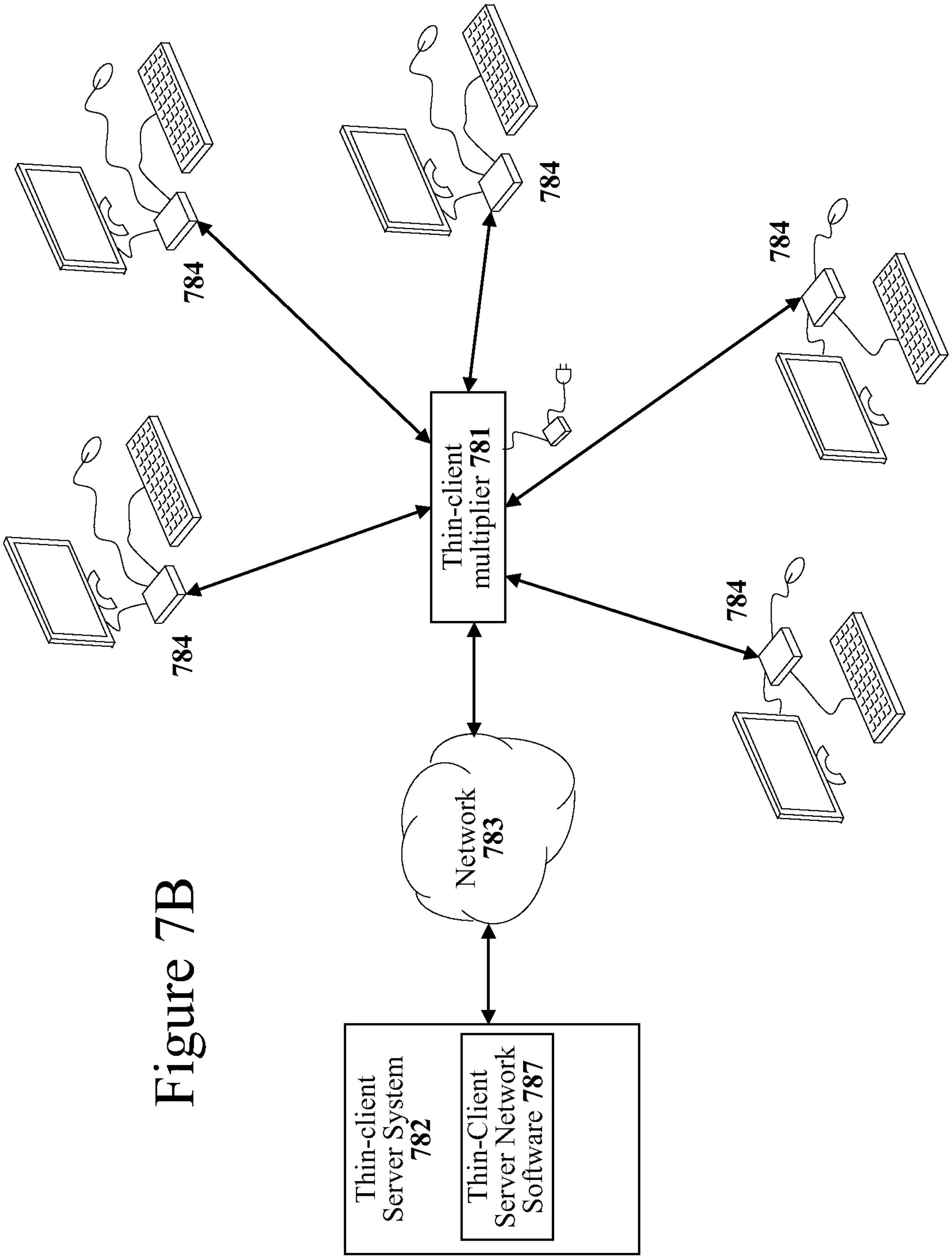
FIG. 7B illustrates a terminal multiplier that drives the video displays for five different terminal systems.

In systems that handle multiple display systems, the amount of memory bandwidth required will become very large. FIG. 7B illustrates an example of a terminal multiplier 781 that generates video output for five different terminal systems 784. The terminal systems 784 access a terminal server 782 through network 783. In a system, such as terminal multiplier 781, that supports multiple displays with a single shared memory system the total memory bandwidth required is:

Grand Total for $N$ displays=$N*1.5R*(Hv*Vv+2*Hd*Vd)$

Thus, the video memory system in terminal multiplier 781 of FIG. 7B must have 7.5R*(Hv*Vv+2*Hd*Vd) of memory bandwidth just to handle the video output for the five terminals systems 784.

Eliminating Redundant Data Reads

The pipelined video system of FIG. 7A greatly reduces the memory bandwidth usage of video system, however there are still significantly inefficient aspects. One inefficient aspect is that when a full-motion video window is being displayed in a window, the video system will read both the key color data out of the frame buffer for that full-motion video window area and the actual full-motion video information that will be displayed within the full-motion video window. All of the key color data read out of the full-motion video window area of the frame buffer will be discarded and replaced with the full-motion video information from the full-motion video buffer. Thus, this discarded key color data represents inefficient memory usage.

Other windows may be overlaid on top of a full-motion video window. In regions where another window is overlaid on top of a full-motion video window, the frame buffer will not have key color data such that the data from the frame buffer will be used and the full-motion data read from the full-motion video buffer will be discarded. This discarded full-motion video data also represents inefficient memory usage. Between the discarded key color data and discarded full-motion video data, two sets of display data are read for the full-motion video window but data from only one set will be used for each pixel. The other data is discarded.

Figure 8A:
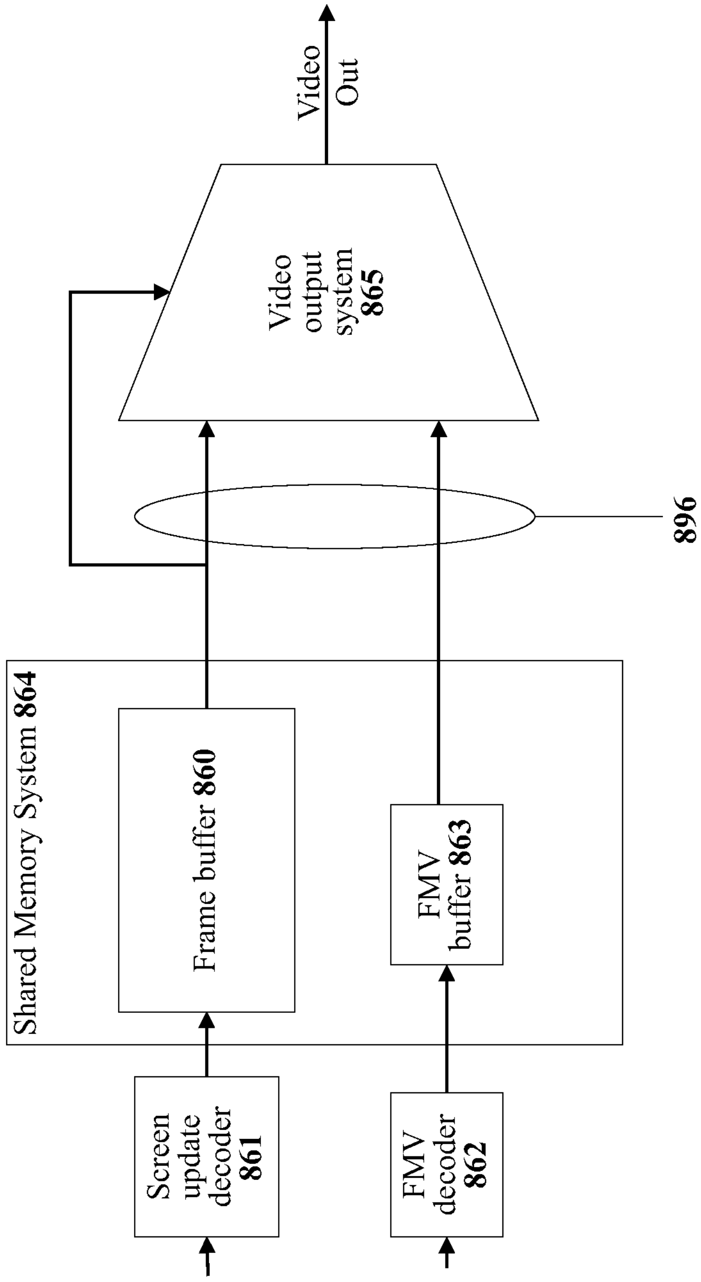
FIG. 8A illustrates a conceptual diagram of a typical implementation of the video output system of FIG. 5 that reads all of the data from both the frame buffer and the full-motion video buffer.

The reason for the above inefficiency is that the key color data stored within the frame buffer must be read since that key color data is used to select whether data from the frame buffer or data from the full-motion video buffer will be displayed. This is illustrated conceptually in FIG. 8A wherein the pixels read from the frame buffer are used to control the video output system 865 like a multiplexer. Thus, the entire frame buffer must be read to determine where to display full-motion video and where to display data from the frame buffer. Similarly, the entire full-motion video buffer must be read since the full-motion video pixel must be immediately available if the corresponding pixel read from the frame buffer specifies a full-motion video pixel.

To eliminate all of this redundant data reading, a technique called On-The-Fly (OTF) key color generation was invented. With On-The-Fly (OTF) key color generation, the video system is informed about the location of all the various windows displayed on a user's desktop display. The On-The-Fly (OTF) key color generation system then calculates the locations where pixels must be read from the frame buffer and where pixels must be read from the full-motion video buffer such that no redundant data reading is required.

Figure 8B:
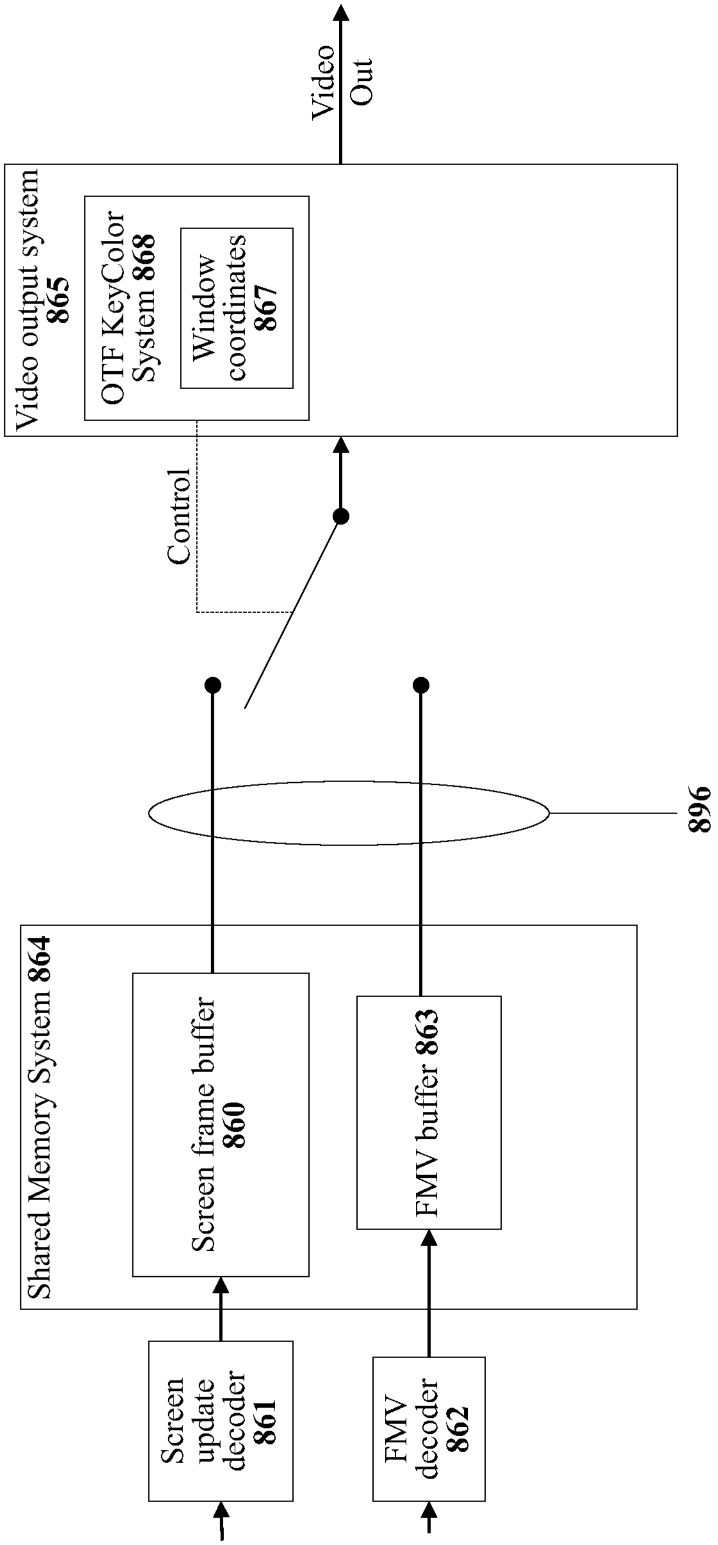
FIG. 8B illustrates a conceptual diagram of an improved implementation of the video output system of FIG. 8A that only reads data from either the frame buffer or the full-motion video buffer.

On-The-Fly (OTF) key color generation may be implemented in several different manners. The patent application "SYSTEM AND METHOD FOR ON-THE-FLY KEY COLOR GENERATION" with Ser. No. 12/947,294 filed on Nov. 16, 2010 discloses several methods of implementing an On-The-Fly (OTF) key color generation system and is hereby incorporated by reference. In some implementations, the On-The-Fly (OTF) key color generation system maintains the coordinates of where a full-motion video window is located on the desktop display and tables that provide the coordinates of all the windows (if any) that are overlaid on top of the full-motion video window. FIG. 8B illustrates a conceptual diagram of a video system constructed with an -The-Fly (OTF) key color generation system 868. The On-The-Fly (OTF) key color generation system 868 compares the screen co-ordinates against the tables of windows coordinates 867 to determine if frame buffer pixels or full-motion video pixels are needed.

Depending on the implementation, the On-The-Fly (OTF) key color generation system 868 may or may not literally generate key color pixels. In some embodiments, the On-The-Fly (OTF) Key color generation system 868 will simple control the reading of pixel information with a signal. In other embodiments, the On-The-Fly (OTF) key color generation system 868 synthetically generates actual Key color pixels that may be provided to legacy display circuitry that operates using the synthetically generated key color pixels. In such embodiments, the On-The-Fly (OTF) key color generation system 868 may also generate dummy full-motion video pixels that are discarded by the legacy display circuitry.

Referring to the conceptual diagram of FIG. 8B, if the On-The-Fly (OTF) key color generation system 868 does not generate a key color signal (or pixel), then the video output system 865 reads data from the screen frame buffer 860 in the memory system memory 864. During such times, the full-motion video data read path is disabled. Conversely, when the On-The-Fly (OTF) key color generation system 868 generates a key color signal (or pixel), the video output system 865 enables the full-motion video read path to read full-motion video information out of the full-motion video buffer 863 (and the frame buffer read path is suspended). By only reading from one buffer or the other, significant memory bandwidth savings are achieved.

Note that in a system that uses the On-The-Fly (OTF) key color generation, having no full-motion video to display may appear to be the worst case situation for data read-out. Specifically, frame buffer data reads (of 3 bytes of RGB data per pixel) require more bandwidth than full-motion video data reads (of 1.5 bytes of YUV data per pixel). Thus, the maximum possible memory bandwidth required by the system for a single user will be Hd*Vd*R*3 bytes/sec when no full-motion video is displayed. (For an 'N' user system the maximum memory bandwidth required by the video display to read out display data is N*Hd*Vd*R*3 bytes/sec.)

When a user has a large full-motion video window open, the On-The-Fly (OTF) key color generation system 868 of FIG. 8B will not fetch the key color data from the frame buffer in the full-motion video window area. Thus, when a user has a full-motion video window with a horizontal resolution of Hw and a vertical resolution of Vw, the total memory bandwidth to read out the data for a scan of the display screen is:

Full Frame buffer read from memory $=Hd*Vd*R*3$ bytes/sec

Savings by not reading FMV window Key color data $=Hw*Vw*R*3$ bytes/sec

FMV read at a rate of monitor refresh $=Hv*Vv*R*1.5$ bytes/sec

Grand Total $=(Hd*Vd-Hw*Vw)*R*3$ bytes/sec $+Hv*Vv*R*1.5$ bytes/sec

Referring to FIG. 8B, in a system with the On-The-Fly (OTF) Key color generation system, the video output system 865 will only read from the screen frame buffer 860 when there is no full-motion video to display. As set forth above, this is worse from the read perspective since reads from the frame buffer are three bytes per pixel and reads from the full-motion video are 1.5 bytes per pixel. On the other hand, the write situation is improved when there is no full-motion video being displayed since the full-motion video decoder 862 will not consume any memory bandwidth writing full-motion video data into the memory system 864 since there is no full-motion video to decode. Thus, in the worst case read situation, the write situation is simplified. Similarly, when a user is viewing full-motion video, the full-motion video decoder 862 will be active writing data but the amount of memory bandwidth consumed by video output system 865 with read operations will generally be reduced since the pixel information read from the full-motion video buffer 863 is half the size of pixel information read from the screen frame buffer 860 on a pixel by pixel basis. Thus, the read and write systems for video display systems that employs On-The-Fly (OTF) Key color generation will generally complement each other with one reducing memory bandwidth requirements when the other system needs more memory bandwidth.

Problems with Scaled Down Full-Motion Video Windows

As set forth in the previous section, the read and write systems for video display systems that employs On-The-Fly (OTF) Key color generation will generally offset each other with one reducing memory bandwidth requirements when the other system needs more memory bandwidth. However, there is one situation wherein this mutual offsetting does not work very well. Specifically, when a user scales a full-motion video window down to a very small size, the memory bandwidth savings from displaying full-motion video will be significantly reduced.

When a user requests the display of a full-motion video but then scales down the windows used to display the full-motion video to a small size, the video display system must continue to process the full-motion video but the savings achieved from the displaying the full-motion video are reduced. For example, when the resolution of a window used to display full-motion video is smaller than the native resolution video of the full-motion video then significant amounts of information read out of the full-motion video buffer will be discarded since the full-motion video must be scaled down to fit within the small window created by the user for displaying the full-motion video.

Figure 8C:
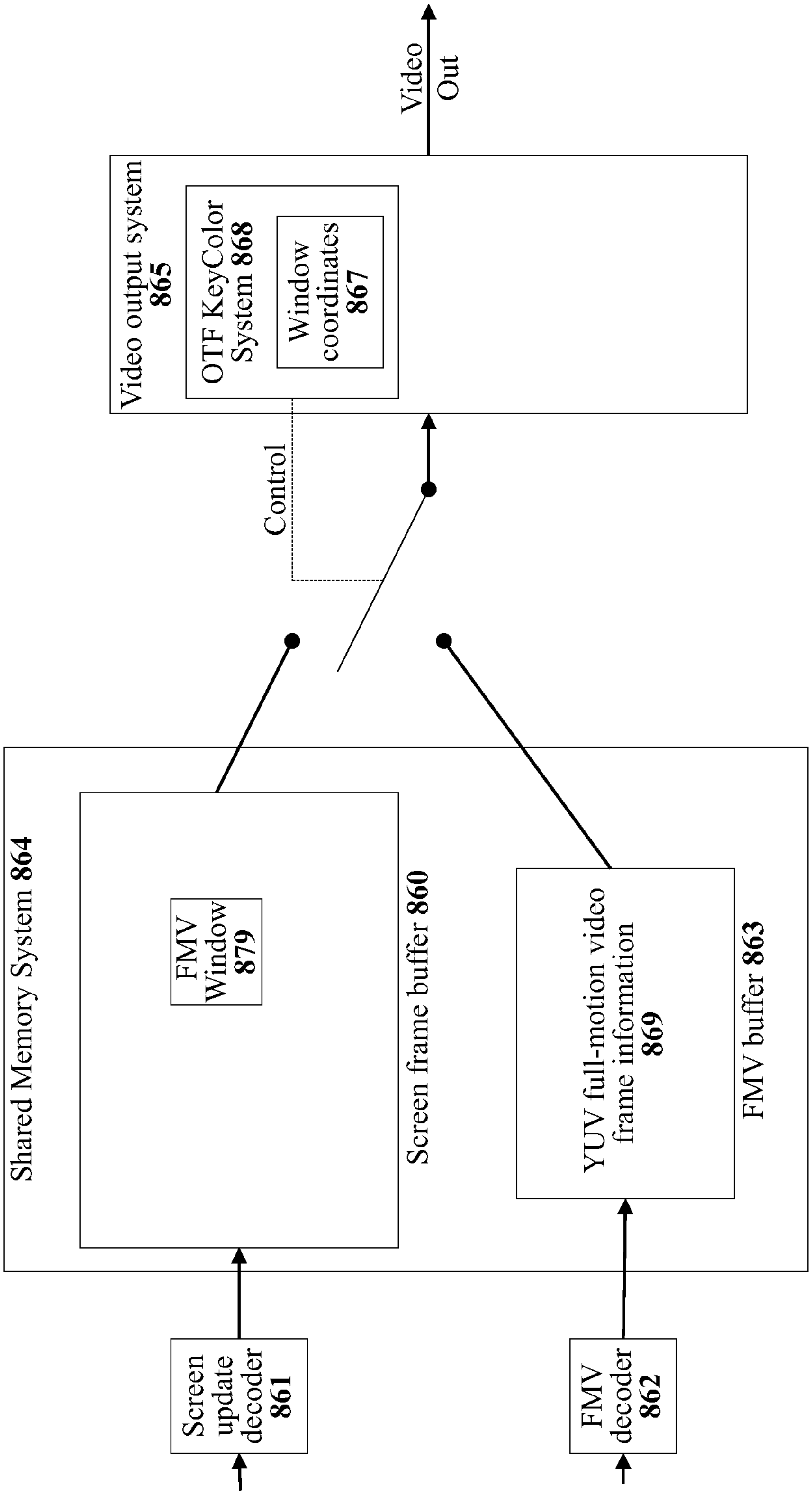
FIG. 8C illustrates a difficult case for the video output system of FIG. 8B wherein a user has reduced the resolution of the full-motion video window such that it is smaller than the native resolution of the full-motion video that will be displayed.

FIG. 8C conceptually illustrates this particular difficult scenario. FIG. 8C illustrates a screen update decoder 861 that receives frame buffer updates to create a display screen frame buffer 860 in shared memory 864 and a full-motion video decoder 862 that receives full-motion video information to create decoded full-motion video frames 869 in a full-motion video buffer 863 within shared memory 864. (Note that the screen update decoder 861 is just one possible method of creating the data in the display screen frame buffer 860 and that any other method of creating data in the display screen frame buffer 860, such as having a local operating system drawing images in the display screen frame buffer 860, could be used.)

As conceptually illustrated in FIG. 8C, a user has scaled down the full-motion video window 879 to a very small size within the display screen frame buffer 860. In order to properly render the screen display, the video output system 865 must read the entire display screen frame buffer 860 with the exception of the small full-motion video window 879 (which only contains Key color pixels that would be discarded). For the area of the full-motion video window 879, the video output system 865 instead reads the entire YUV encoded full-motion video information 869 out of the full-motion video buffer 863 within main memory 864. In the example of FIG. 8C, the YUV encoded full-motion video information 869 is larger than the full-motion video window 879 such that the video output system 865 will scale down the YUV encoded full-motion video information 869 from a larger native resolution to fit within the smaller resolution of full-motion video window 879. Thus, as illustrated in FIG. 8C, even an optimized video system that only reads data which will be displayed (no Key color pixels are read and discarded) may still consume an unnecessarily large amount of memory bandwidth since full-motion video data will be discarded when downsizing the native full-motion video data 869 to fit within the full-motion video window 879.

Full-Motion Video Pre-Processing

As described in the previous section, a user can effectively nullify the advantages of an On-The-Fly (OTF) Key color generation system that eliminates redundant display data reads. Specifically, if a user reduces the window used to display full-motion video down to a single pixel, the video display system will effectively be forced to decode and process full-motion video without achieving any memory bandwidth reductions that would come from not reading the frame buffer in areas where the full-motion video is displayed. This would essentially render the difficult work of creating an efficient On-The-Fly (OTF) Key color generation system moot. To provide this from occurring, this document discloses a full-motion video pre-processing system that reduces full-motion video information upon entry when necessary. Thus, if a user significantly reduces the size of a desktop window used to display full-motion video then pre-processor will similarly reduce the amount of full-motion video information allowed to enter the system.

Figure 9A:
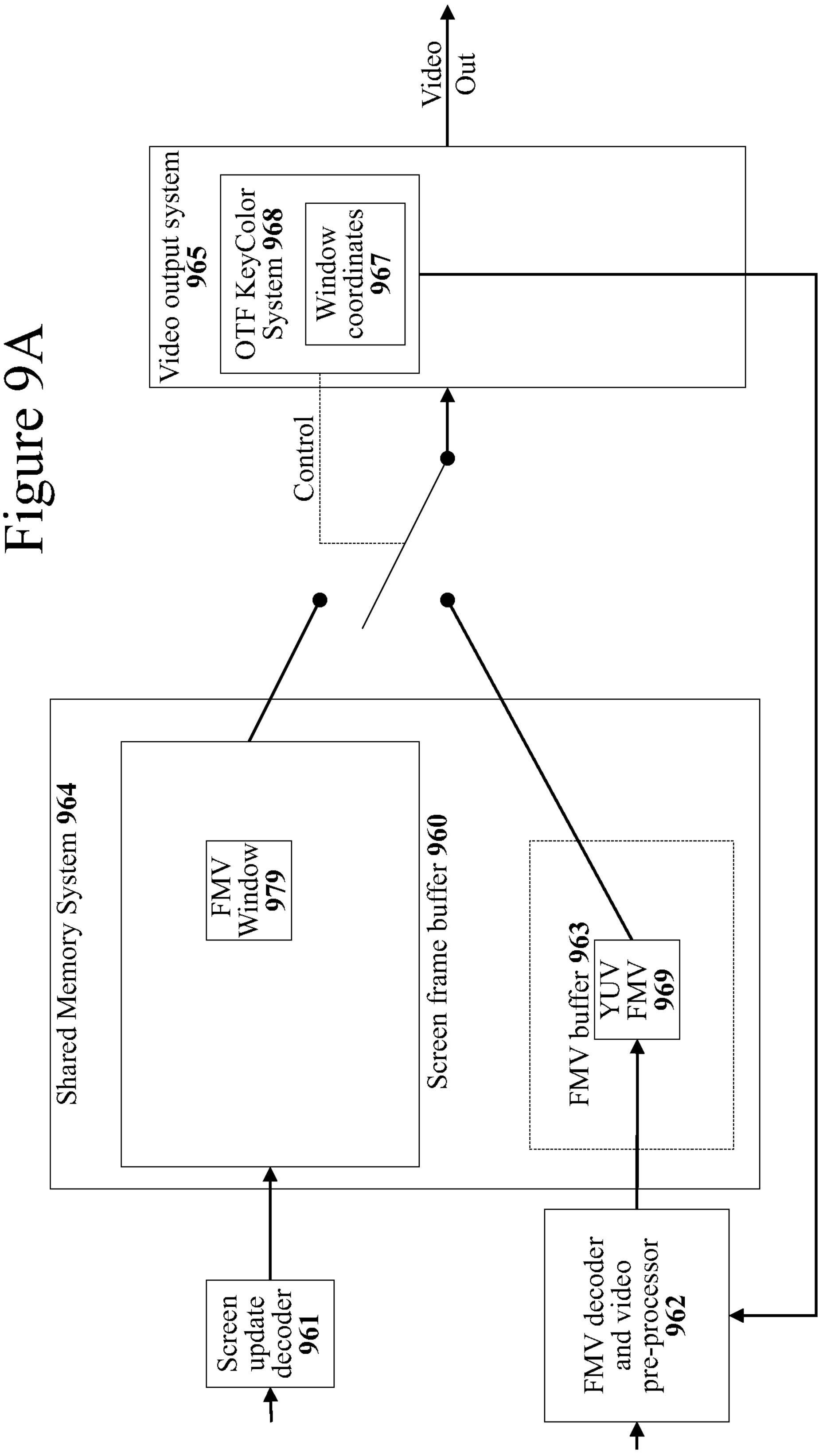
FIG. 9A illustrates a video output system that solves the difficult case of FIG. 8C by using a combined video decoder and video pre-processor to reduce the incoming full-motion video.

FIG. 9A conceptually illustrates how the pre-processor will prevent a user from nullifying the memory bandwidth savings produced by the On-The-Fly (OTF) Key color generation system 968. In the embodiment of FIG. 9A, the full-motion video decoder 962 now includes a video pre-processor module. The On-The-Fly (OTF) Key color generation system 968 that keeps track of all the window coordinates 967 informs the video pre-processor module about the resolution of the full-motion video window 979. (Note that in other embodiments, the size of the full-motion video window 979 may come from other entities that keep track of window sizes.) If the resolution of the full-motion video window 979 is smaller than the native resolution of the incoming full-motion video, then the video pre-processor module will scale down the size of the YUV encoded full-motion video information 969 that is stored in the shared memory system 964.

In the example of FIG. 9A, the pre-processor down-scaled the full-motion video 969 from a larger native resolution (illustrated with a dashed rectangle) down to a smaller resolution (generally the same resolution as the full-motion video window 979). Note that the video pre-processor module performs this scaling operation before the YUV encoded full-motion video information 969 ever reaches the shared memory system 964 such that there is a memory bandwidth savings. Specifically, less memory bandwidth is consumed writing of the scaled-down full-motion video information 969 in FIG. 9A than is consumed while writing of the native resolution full-motion video information 869 in FIG. 8C.

In the embodiment disclosed in FIG. 9A, the user cannot nullify the memory bandwidth savings produced by the On-The-Fly (OTF) Key color generation system 968 by reducing the size of the full-motion video window 979. When a user does reduce the size of the full-motion video window 979, the size of the YUV encoded full-motion video information 969 in the full-motion video buffer 963 may be reduced by the same amount. This ensures that the worst-case situation (when the user shrinks the window used to display full-motion video down to the smallest possible size), the memory bandwidth for reading out display data can be calculated as being approximately=Hd*Vd*R*3 bytes/sec (a full reading of the normal frame buffer read from memory).

Figure 9B:
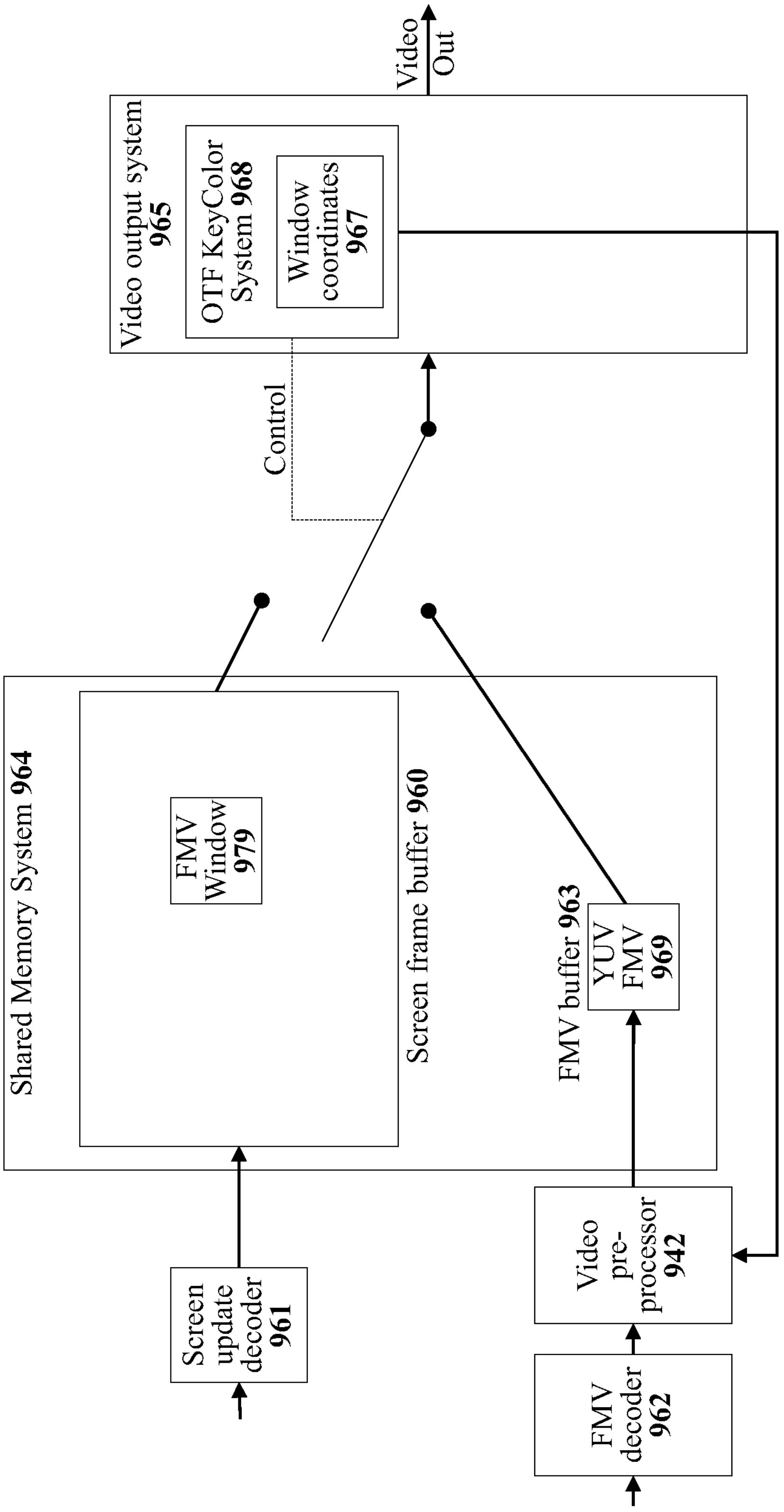
FIG. 9B illustrates the video output system of FIG. 9A wherein the video pre-processor is implemented as a separate module that follows the full-motion video decoder.

The video pre-processor may be implemented in many different manners. In the embodiment of FIG. 9A, the video pre-processor is implemented as part of the full-motion decoder. In an alternate embodiment illustrated in FIG. 9B, the video pre-processor 942 is implemented as a second processing stage that follows the full-motion video decoder 962. The key concept is to reduce the size of the YUV encoded full-motion video information 969 before that full-motion video information is stored in the full-motion video buffer 963 within the shared memory system 964. In this manner, the consumption of memory bandwidth from the shared memory system 964 is minimized. Note that the memory bandwidth savings is realized both when the video pre-processor 942 writes the scaled down YUV full-motion video information 969 into the shared memory system 964 and when the video output system 965 reads the scaled down YUV full-motion video information 969 out of the shared memory system 964.

A Full-Motion Video Pre-Processing Implementation with Motion-JPEG

There are many different digital video encoding systems that are used to digital encode video data. This section will focus upon an implementation that uses the motion-JPEG (M-JPEG) digital video encoding system. However, the disclosed video pre-processing system may be implemented with any type of digital video encoding system.

When configured for in the YUV 4:2:0 setting, the motion-JPEG (M-JPEG) digital video encoding system divides individual video image frames into multiple 16 by 16 pixel blocks known as Minimum Coded Units (MCUs) and each 16 by 16 pixel MCU consists of a total of six 8 by 8 element Macro Blocks (MB). Four of the 8 by 8 element macro blocks are used to store luminance (Y) data in a one byte of data to one pixel mapping such that each pixel has its own luminance value. The other two 8 by 8 element macro blocks are used to store chrominance (color) data: a first 8 by 8 element macro block stores Cr data and a second 8 by 8 element macro blocks stores Cb data. Each 8 by 8 chrominance element (Cr or Cb) macro block is applied to a 16 by 16 pixel MCU in a manner wherein each byte of chrominance data is applied to a 2 by 2 luminance pixel patch.

Figure 10A:
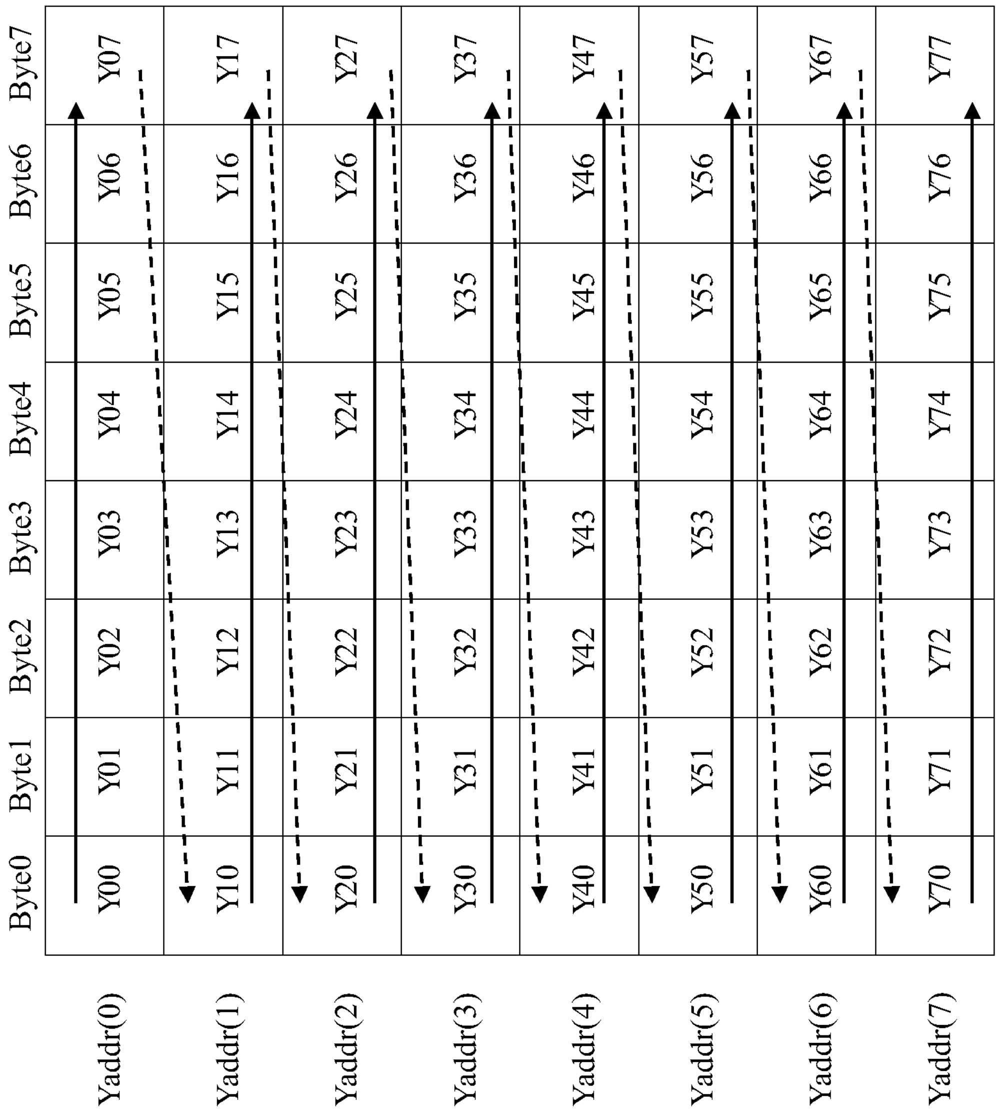
FIG. 10A illustrates the data organization of a luminance macro block used within the motion-JPEG video encoding system.
Figure 10B:
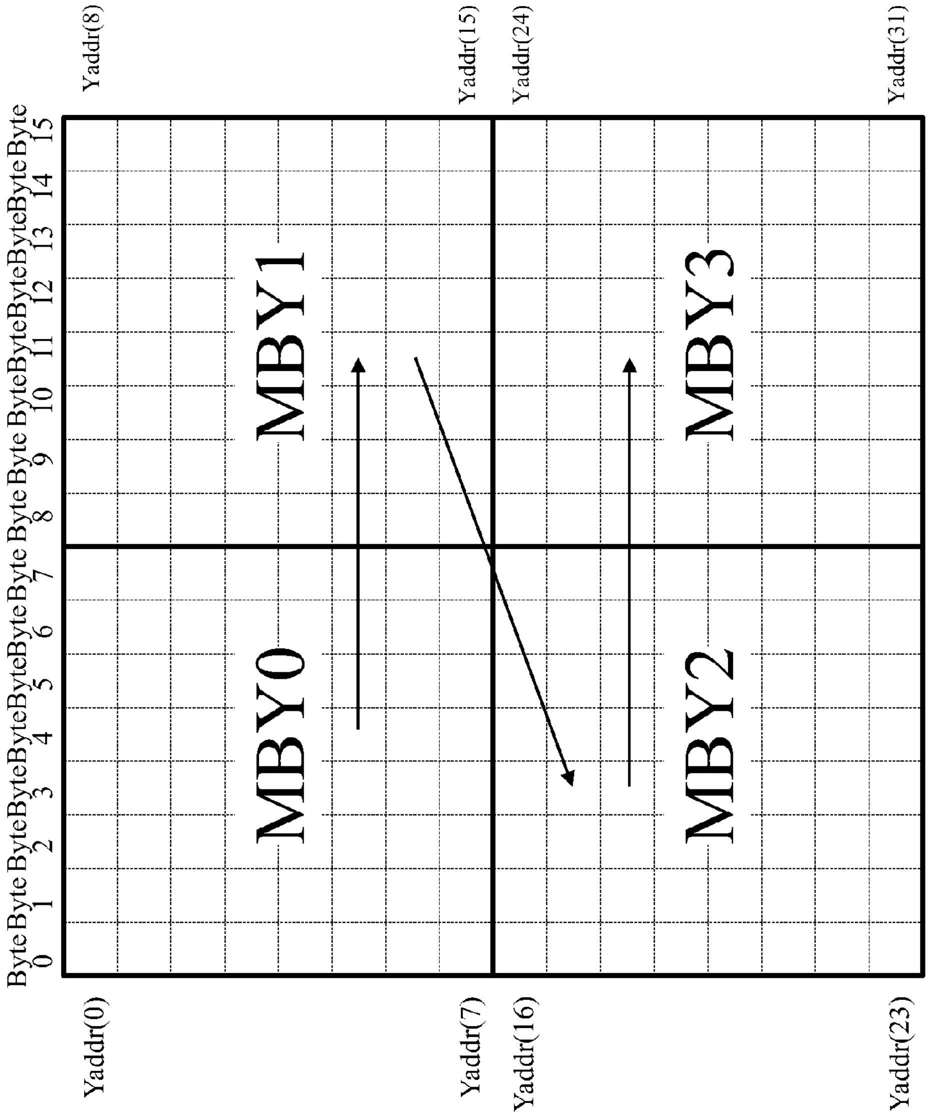
FIG. 10B illustrates the data organization of the luminance portion of a minimum coding unit (MCU) comprised of four macro blocks as disclosed in FIG. 10A.

FIG. 10A illustrates the organization of an 8 by 8 luminance element macro block used to store luminance (Y) data with one byte of luminance data per pixel. The pattern for the 64 linear bytes of data is illustrated with arrows FIG. 10A. Four of the 8 by 8 pixel luminance macro blocks disclosed in FIG. 10A are used to construct a 16 by 16 pixel MCU. FIG. 10B illustrates the organization of the luminance data for a full 16 by 16 pixel MCU constructed from four 8 by 8 pixel luminance macro blocks. Note that the four macro blocks are stored in the order specified by the arrows illustrated in FIG. 10B. Specifically, the 8 by 8 pixel luminance macro blocks are stored in the order MBY0 (upper-left), MBY1 (upper-right), MBY2 (lower-left), and then MBY3 (lower-right).

Figure 10D:
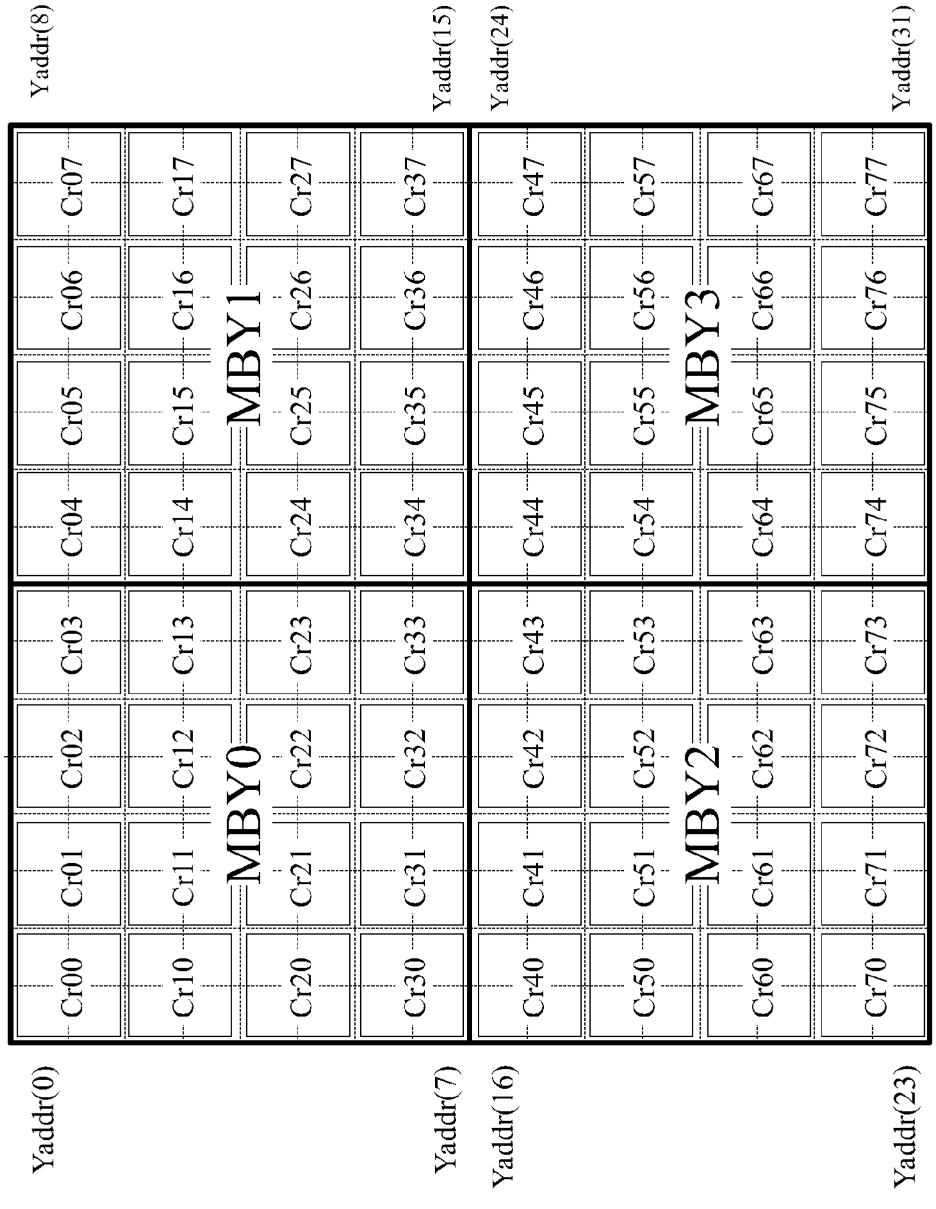
FIG. 10D illustrates how a chrominance macro block disclosed in FIG. 10C is applied to a 16 by 16 pixel MCU as disclosed in FIG. 10B.
Figure 10E:
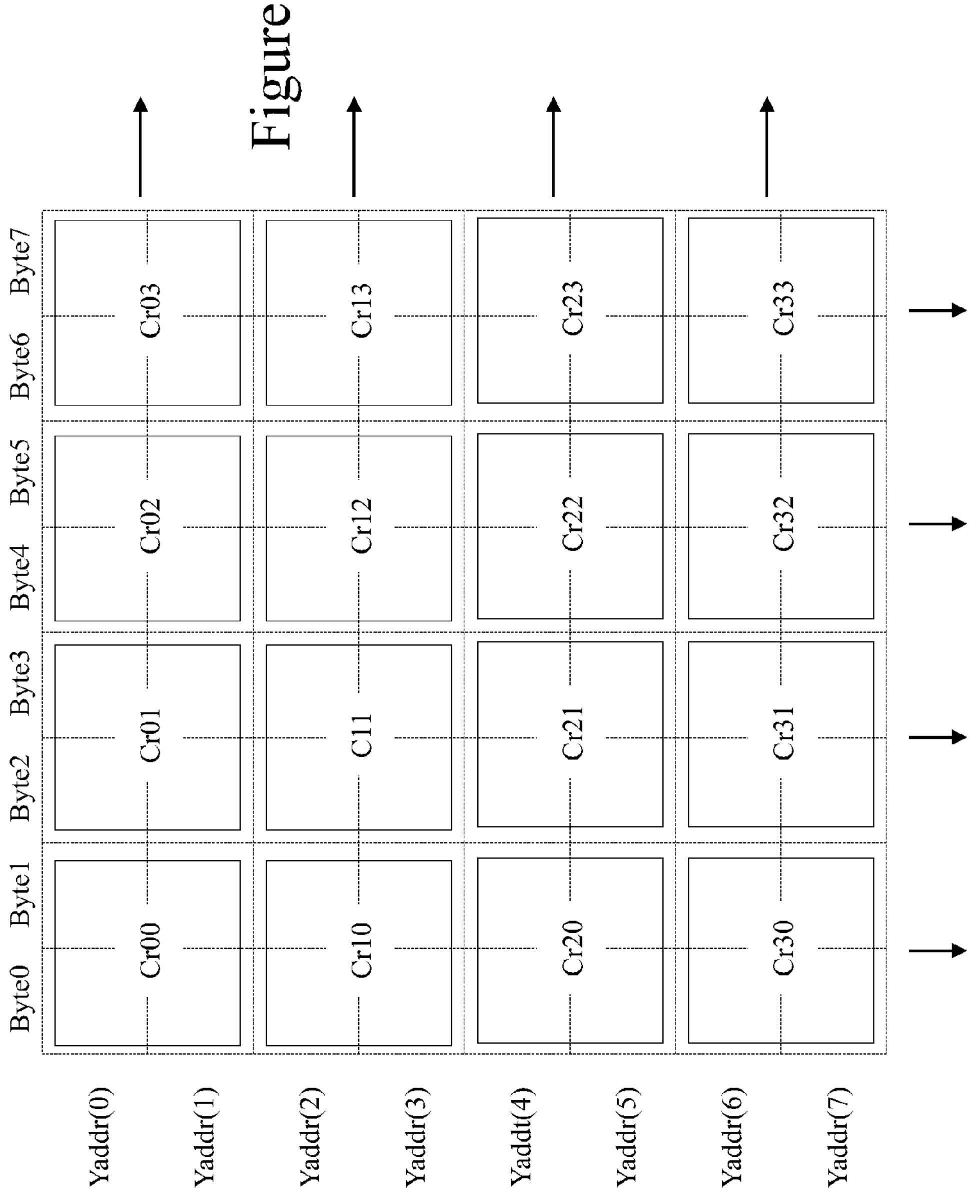
FIG. 10E illustrates how the data from part of a chrominance macro block disclosed in FIG. 10C is used with a luminance macro block disclosed in FIG. 10A.

FIG. 10C illustrates the organization of an 8 by 8 element macro block used to store Cr chrominance data with one byte of Cr chrominance data. (The same structure is used to store Cb chrominance data.) The Cr and Cb chrominance data is sub-sampled such that there is only one byte of Cr and Cb chrominance data for four pixels. Specifically, each 2 by 2 pixel patch in the 16 by 16 pixel MCU is mapped to one of the Cr bytes of FIG. 10C as illustrated in FIG. 10D. FIG. 10E illustrates how the upper-left quarter of the Cr data in FIG. 10C is mapped to the upper-left macro block (MBY0) of FIG. 10B. The same mapping will also be used for the Cb chrominance data.

Figure 10F:
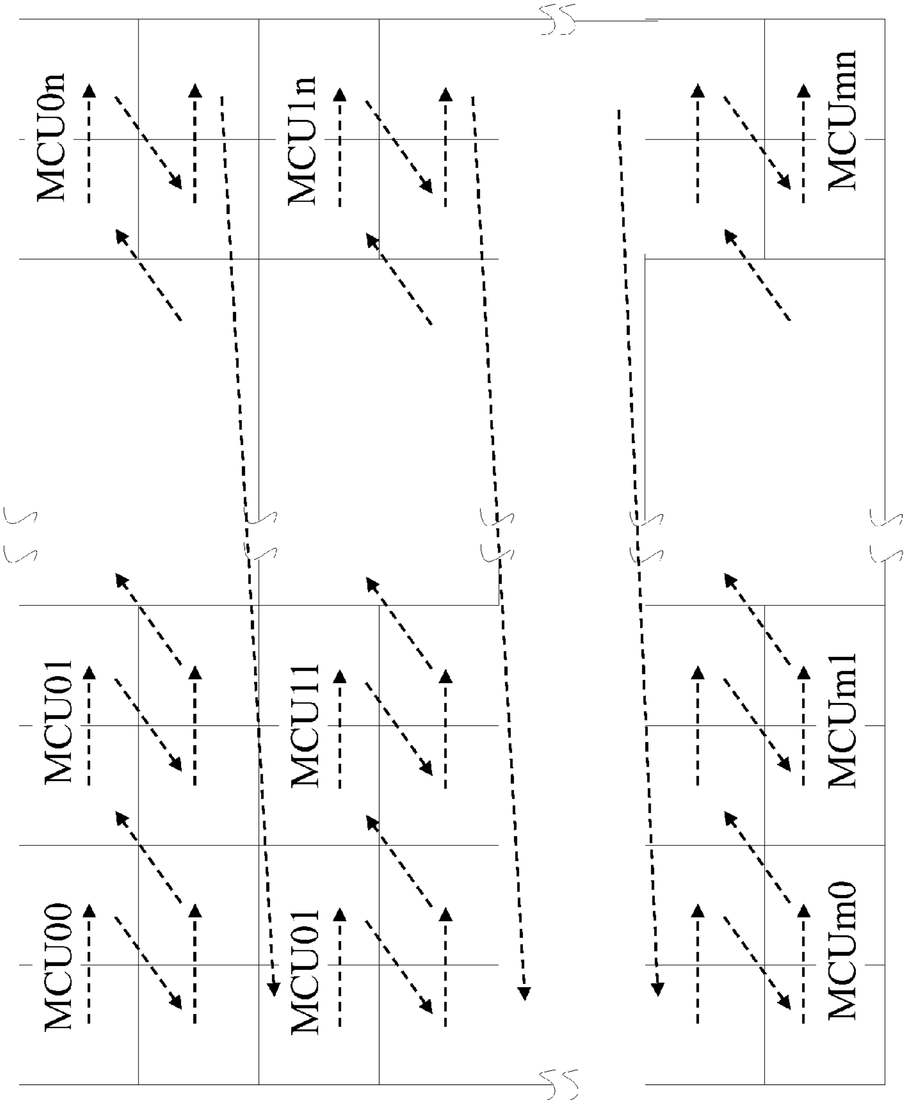
FIG. 10F illustrates how a plurality of minimum coding units (MCUs) disclosed in FIG. 10B are used to create an image.

Finally, FIG. 10F illustrates how a set of 16 by 16 pixel MCUs are organized to create an entire display screen image frame. Each one of the MCUs illustrated in FIG. 10F is constructed with four 8 by 8 pixel luminance macro blocks as illustrated in FIG. 10A that are organized as illustrated in FIG. 10B, one 8 by 8 Cr chrominance data macro block as illustrated in FIG. 10A that is applied to the 16 by 16 pixel MCU as depicted in FIG. 10D, and an 8 by 8 Cb chrominance data macro block that is applied to the 16 by 16 pixel MCU in the same manner as depicted in FIG. 10D (except that Cb data is used instead of Cr data).

Figure 11A:
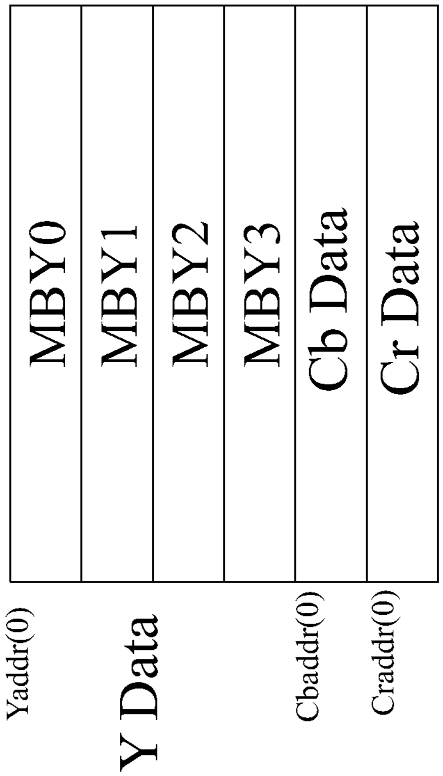
FIG. 11A illustrates how the luminance and chrominance macro blocks are organized sequentially in memory to define a full minimum coding units (MCUs).
Figure 11B:
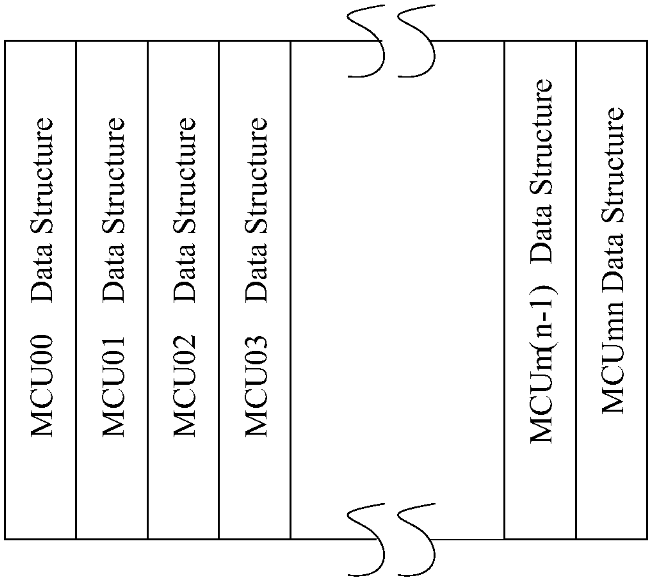
FIG. 11B illustrates a plurality of minimum coding units (MCUs) organized linearly in memory.

The data for each 16 by 16 pixel MCU is transmitted as four consecutive 8 by 8 pixel luminance macro blocks (MBY0, MBY1, MBY2, and MBY3) followed by the 8 by 8 Cb chrominance data macro block and 8 by 8 Cr chrominance data macro block as illustrated in FIG. 11A. The data for all the 16 by 16 pixel MCUs illustrated in FIG. 10F are arranged linearly as depicted in FIG. 11B.

As set forth in FIGS. 10A to 11B, the encoded data for the motion-JPEG image frames is organized in a manner that is best suited for encoding and decoding the motion-JPEG image frames. However, this data formatting is not ideal for the processing of full-motion video frames in order to reduce the image frame resolution. For horizontal rescaling, it would be best to have adjacent horizontal pixels in close memory proximity to each other. Similarly, for vertical rescaling, it would be best to have adjacent pixel rows in close memory proximity to each other.

Similarly, the data organization depicted in FIGS. 10A to 11B is not ideal for reading out the image data for display on a display screen. Digital display systems generally follow the traditional scanning order created for legacy Cathode Ray Tube (CRT) systems. Specifically, digital display systems generally follows a row by row data read-out that starts from the top row of the display and proceeds to the bottom row of the display scanning from left to right for each row.

FIGS. 12A and 12B illustrate one possible data organization that is better suited for scanning video images from memory for display on a display screen. FIG. 12A illustrates one arrangement for organizing luminance (Y) data for an n by m image frame in a left to right and top to bottom pixel row format that can easily be scanned by a display system. Similarly, FIG. 12B illustrates chrominance (Cr and Cb) data organized in a manner that can be used with the luminance data organization of FIG. 12A. With data organized as illustrated in FIGS. 12A and 12B (or in similar arrangements), a video display system can quickly read-out the needed data linearly.

Properly data formatting is also very important since it allows special features for efficient memory access within memory controllers, memory, and processor to be used. In one embodiment the system uses a 32-bit internal bus structure to the memory controller that has a special 16 cycle burst access feature. Thus, the memory controller can quickly transfer 64 bytes (16 operations of 4 bytes each) in a single efficient burst. Because of the structure of the Motion-JPEG data with sixteen byte wide macro blocks, the effective use a 16 cycle burst requires a minimum of four MCUs (4 MCUs*16 bytes/wide=64 bytes) to be present in local memory before the transformation can take place. As a result, the minimum local memory required to hold four MCUs is 1 KB for the luminance (Y) data (4*16 bytes*16 rows) and 0.5 KB for Cr and Cb together (each=4*8 bytes*8 rows) or a total of 1.5 KB. In one embodiment, a ping-pong memory structure (with two memory buffers) is used in order to keep the processing pipeline moving smoothly, thus bringing the total internal memory requirement to 3 KB. A ping-pong memory structure can be utilized using either with two memory buffers, with a dual-port memory buffer, or with a single memory buffer depending upon the input/output rates.

Figure 13A:
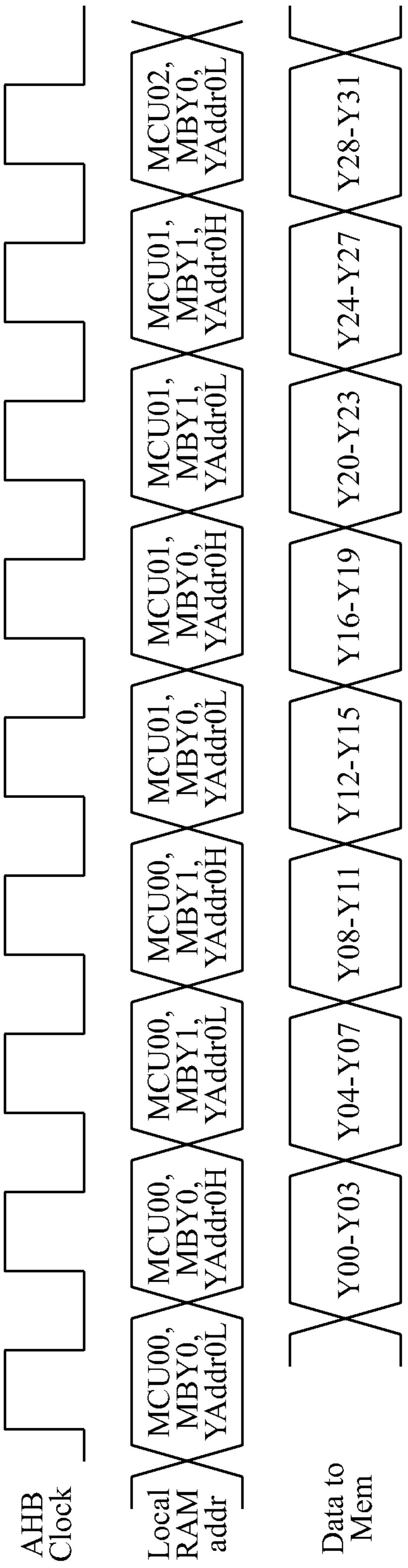
FIG. 13A illustrates one possible timing diagram for efficiently outputting rasterized luminance data to a memory system.
Figure 13B:
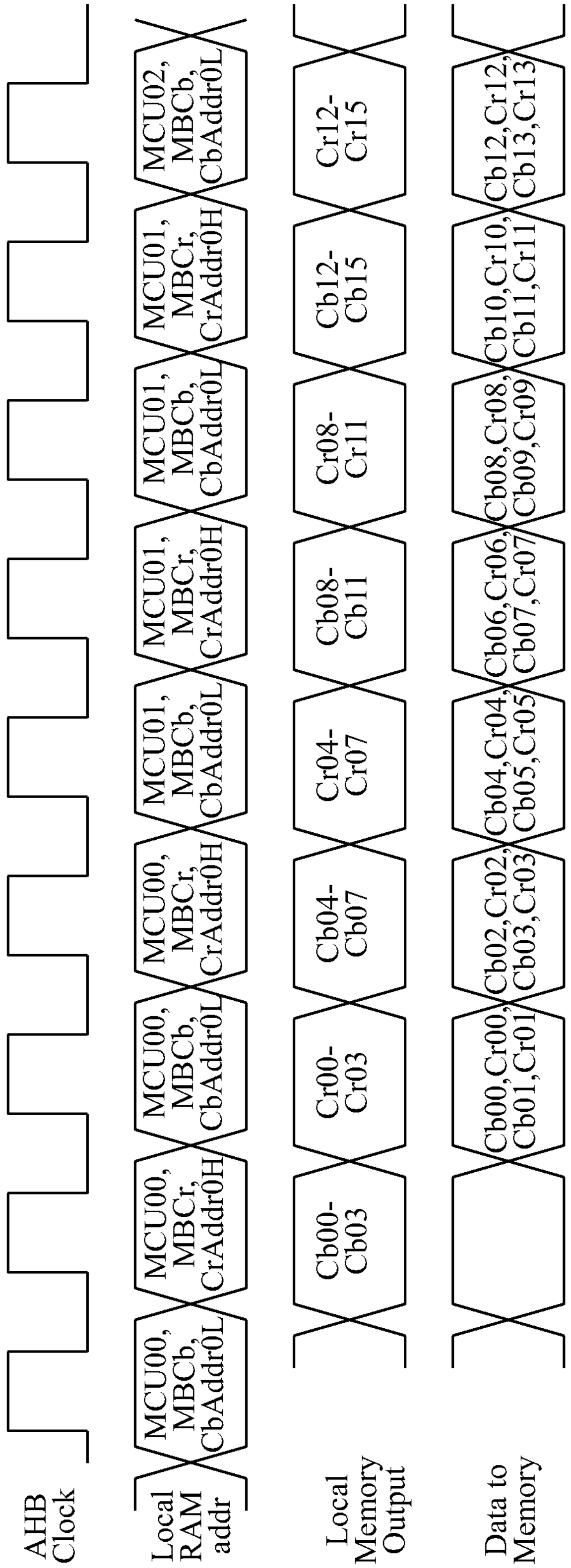
FIG. 13B illustrates one possible timing diagram for efficiently outputting rasterized chrominance data to a memory system.

With four MCUs in the local internal memory for the pre-processor, the pre-processor can write data to the shared memory efficiently. FIGS. 13A and 13B illustrate a timing diagram that illustrates how the pre-processor may write to the shared memory system. FIG. 13A illustrates how the luminance (Y) data may be written to the shared memory using the 16 cycle burst feature. FIG. 13B illustrates how the chrominance data (both Cr and Cb) may be written to the shared memory using the 16 cycle burst feature.

The video system must compete with other users of the shared memory system for access to the shared memory system. As the memory controller goes through arbitration between different masters, it is impossible to guarantee a pipeline that is always full. To circumvent this issue, one embodiment implements a stalling mechanism that may be used to stall the incoming data (from the motion-JPEG decoder).

Resizing an Image Frame Down

As set forth in the previous sections, the video pre-processor receives decoded full-motion video data from the Motion-JPEG decoder in a macro block format. To prepare the full-motion video data for output by the video output system, the video pre-processor scales down the full-motion video when necessary to fit within a smaller full-motion video window created by a user. The video pre-processor may also convert the full-motion video data into a raster scan format that is better suited for the video output system that will read the pre-processed video data. The video pre-processor performs the scaling down (only when necessary) and rasterization internally. The video pre-processor then outputs the scaled and rasterized full-motion video data to the shared memory system. An example of a possible rasterized data format is illustrated in FIGS. 12A and 12B. The video output system will then read the scaled and rasterized full-motion video data from the shared memory system to create a video output signal.

Figure 14A:
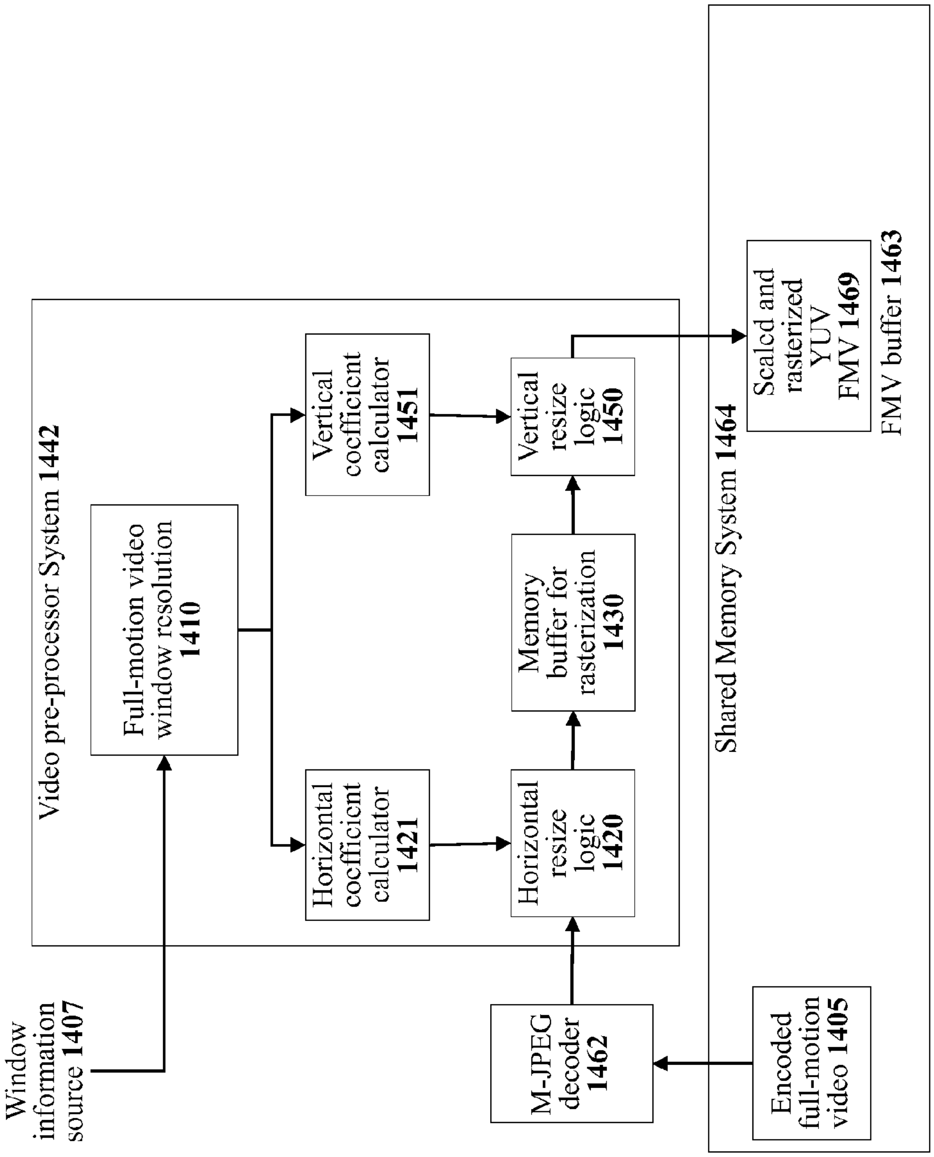
FIG. 14A illustrates a block diagram of a video pre-processor for reducing the resolution of decoded full-motion video data.

FIG. 14A illustrates a block diagram of one implementation of a video pre-processor 1442 that may be used to scale down and rasterize full-motion video information. On the left-side of FIG. 14A, encoded full-motion video information 1405 enters the system. This encoded full-motion video information 1405 may be from a network stream, a file, or any other digital full-motion video source. The encoded full-motion video information 1405 is then processed by an appropriate digital video decoder 1462. In this example, a motion-JPEG video decoder 1462 decodes the encoded full-motion video information 1405. Internally, the motion-JPEG video decoder 1462 may use small memory buffers to collect information for each MCU processed.

After video decoder 1462, pieces of decoded full-motion video are then provided to a video pre-processor system 1442. In one embodiment, the video decoder 1462 provides decoded full-motion video information in decoded MCU sized chunks to the video pre-processor 1442. The video pre-processor 1442 also receives information about the window that will be used to display the full-motion video. Specifically, a window information source 1407 provides full-motion video window resolution information 1410 to the video pre-processor system 1442 so the video pre-processor system 1442 can determine whether scaling of the full-motion video information is required and output size needed. The full-motion video window resolution information 1410 is provided to a horizontal coefficient calculator 1421 and a vertical coefficient calculator 1451 that calculate coefficient values that will be used in the down-scaling process (if down-scaling necessary).

The chunks of decoded full motion video information are first provided to horizontal resize logic block 1420 that uses the coefficients received from the horizontal coefficient calculator 1421 to rescale the video information in a horizontal direction. If the resolution of the full-motion video window is larger than or equal to the native resolution of the full-motion video then no rescaling needs to be performed. When rescaling is required, the horizontal resize logic block 1420 will rescale the video using the coefficients received from the horizontal coefficient calculator 1421. The rescaling may be performed in various different manners. In one embodiment designed for efficiency, the horizontal resize logic block 1420 will simply drop some pixels from the incoming full-motion image frame to make the frames smaller in the horizontal direction.

The horizontal resize logic block 1420 also changes the format of the data into a rasterized data format. The rasterized data format will simplify the later vertical resizing stage and the eventual read-out of the data by the video output system. The horizontal resize logic block 1420 outputs the horizontally rescaled and rasterized data into a temporary memory buffer 1430.

FIG. 15A illustrates how 4 MCUS (four horizontally 16 by 16 pixel MCUs) of rasterized luminance (Y) data may appear in the temporary memory buffer 1430 after a 1 to 1 down-sizing (no change in size). In FIG. 15A each Ym.n number denotes luminance data for row number m, column number n. FIG. 15B illustrates how 8 MCUS (eight horizontally adjacent 16 by 16 pixel MCUs) of rasterized luminance (Y) data may appear in the temporary memory buffer 1430 after a 2 to 1 (50%) down-sizing occurred. Note that the odd pixel columns have been removed.

Figure 15C:
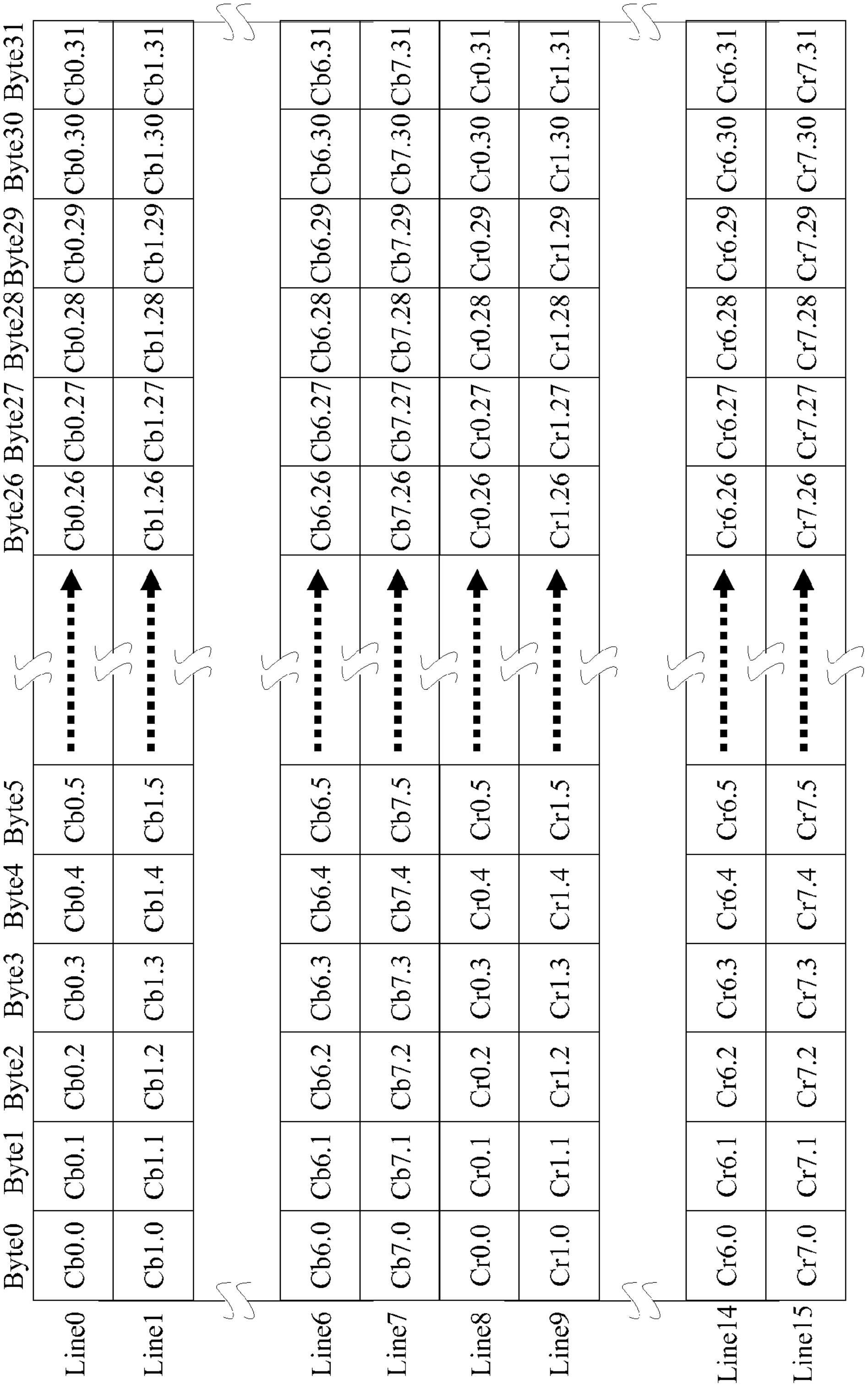
FIG. 15C illustrates chrominance (Cr and Cb) data in a rasterized data format.

Since the chrominance (Cr and Cb) data is already sub-sampled 2 to 1 relative to the luminance (Y) data in 4:2:0 formatted video, the downsizing of chrominance data is performed in a slightly different manner. For example, when the full-motion video information is being downsized 2 to 1 (50% reduction), the data will be the same as when no downsizing occurs since the Cr and Cb data was already downsized relative to the luminance data and they would be upsampled later to 4:4:4 format before display. Thus FIG. 15C illustrates how the rasterized chrominance (Cr and Cb) data may appear in the temporary memory buffer 1430 after a 1 to 1 down-sizing (no change in size) or a 2 to 1 (50%) downsizing.

After horizontal resizing, a vertical resize logic block 1450 reads the horizontally rescaled and rasterized full-motion video data from memory buffer 1430. The vertical resize logic block 1450 uses the coefficients received from the vertical coefficient calculator 1451 to scale down the full-motion video in the vertical direction when necessary. Again, various different methods may be used to perform this resizing but in one embodiment, the vertical resize logic block 1450 will periodically drop rows of data to down-size the full-motion image frames in the vertical dimension.

Figure 16B:
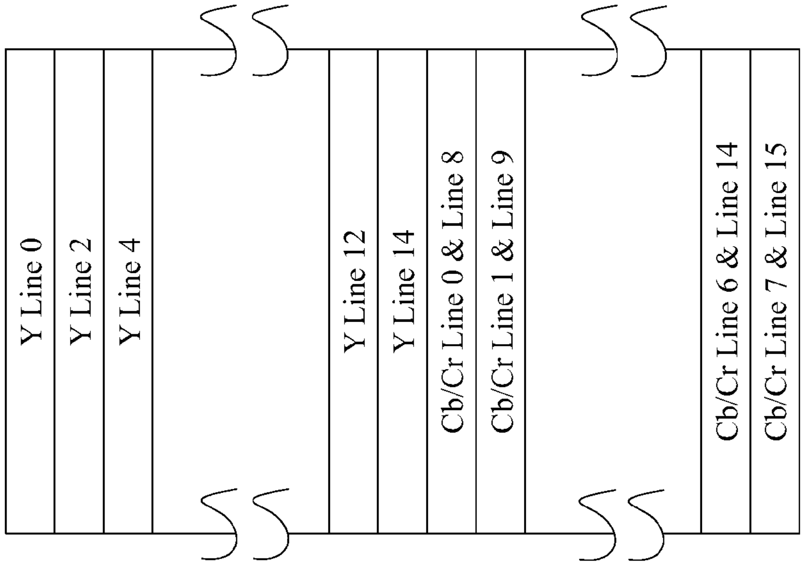
FIG. 16B illustrates one format of full-motion video data that has been downscaled 50% stored in a temporary memory buffer.
Figure 16A:
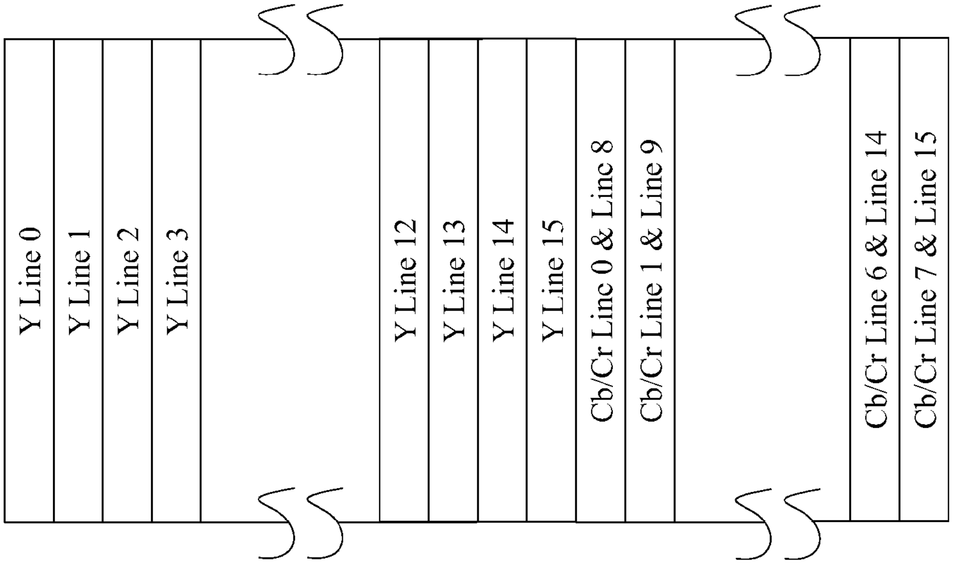
FIG. 16A illustrates one format of full-motion video data stored in a temporary memory buffer.

After the vertical resizing, the vertical resize logic block 1450 writes the horizontally and vertically rescaled and rasterized full-motion video data 1469 into a full-motion video buffer 1463 in the shared memory system 1464. FIG. 16A illustrates how the full-motion video data may be stored in an internal buffer before it is written to the shared memory system 1464. FIG. 16B illustrates how the full-motion video data may be stored in an internal memory buffer after a 2 to 1 (50%) downsizing of the full-motion video data. Note that the chrominance data (Cr and Cb) has not been downsized. FIGS. 12A and 12B illustrates one possible rasterized format that may be used to store the full-motion video data after the resize logic block 1450 writes the horizontally and vertically rescaled and rasterized full-motion video data 1469 into the shared memory system 1464.

A video output system will then read in the rescaled and rasterized full-motion video data 1469 in order to create a video output signal that will drive a video display system. To maximize the throughput to the shared memory system 1464, the output system should output large bursts of data to the shared memory system 1464. In one embodiment, the possible burst choices are 4, 8, 16, or single cycle burst increments. 16 cycle bursts are obviously the most efficient because a larger amount of data is transferred for the same over head costs.

The output row length (the number of columns) of a resized down window may be any number since that is controlled by the user. However, in one implementation, this output row length is made to be a multiple of four to increase efficiency. In a system that always outputs a multiple of four, the system will send out 16 cycle bursts since smaller bursts are inefficient. For example, for an output row length of 88 one implementation will output two 16 cycle bursts of 64 bytes rather than 1 burst of 64 bytes, 1 bursts of 16 bytes, and 2 bursts of 4 bytes. The extra data bits will be ignored. Thus, in one implementation it was assumed that the output luminance (Y) row or chrominance (Cr and Cb) row length is an integral multiple of 16 bursts even though the actual valid data could be lesser. By making a mapped image frame row to the RAM a multiple of 64 bytes the system also does not have to make adjustments for writing across a 1 KB memory boundary.

In one embodiment, the process of resizing an image down will end up performing some combination of down-sampling and up-sampling of the source data. For example, in an embodiment wherein YUV 4:2:0 image frame data is being resized down to >½ vertical or >=½ horizontal of the original size a combination of downsizing and upsizing may be used. The luminance (Y) data will get down sized to the new target size. The chrominance (Cr and Cb) data will not be changed in size significantly since it was already sub sampled. The data is treated differently since there is one byte of luminance (Y) data for each pixel but only 1 byte of Cr and 1 byte of Cb chrominance data for every four pixels. When the image frame is scaled down to ½ vertical or ½ horizontal size, luminance (Y) data gets down sampled while the chrominance (Cr and Cb) data passes through without change. (Since chrominance data is not changed during downsizing, this can be considered as "up-sampled".) When the image frame is scaled down to <½ vertical or <½ horizontal size then all the three components (Y, Cr, and Cb) will be down sampled. The following verilog code provides one set of equations that may be used to scale down full-motion image frames in the horizontal direction:

```
    Definitions:
        k is the pointer to the coefficient table
        coef is the Filter coefficient
        calc__alpha is the intermediate calculation result needed for
keep/discard resolution
        calc__alpha__reg is the Registered value of calc__alpha.
        k__reg is the Registered value of k
        coef__reg is the Registered value of coef
        step is the programmed step size for calculations
always @* begin
    coef__row16 = 0;
    coef = coef__reg;
    k = k__reg;
    calc__alpha = calc__alpha__reg;
    if (calc__alpha__reg >= 256) begin
calc__alpha = calc__alpha__reg -256 + step;
    keep        = 1;
    end
    else begin
    calc__alpha = calc__alpha__reg + step;
    keep        = 0;
    end
    coef[k__reg] = keep;
    if (k__reg==15) begin
    k = 0;
    coef__row16=coef;
    end
    else k = k__reg+1;
  end
always @(posedge clock)
    begin
    calc__alpha__reg <= calc__alpha;
```

-continued

```
    k__reg <= k;
    coef__reg <= coef;
    end
```

The preceding code calculates resize down coefficients on a per pixel basis for a horizontal resize down. In the disclosed embodiment, the output coefficient is a Boolean value 'keep' that determines if a particular pixel is kept or dropped. If keep=1 then the pixel is left intact else if keep=0 then the pixel is discarded. The value of the output coefficient keep is calculated using the step size as shown in the pseudo code. The step value is set as step=256*output columns/input columns for a 8 bit granularity step. For example, in a system where the horizontal scaling is downsizing the number of columns in half then step=256* (½)=128. In one implementation 16 pixels are worked on in parallel, so the coefficients (coef_row16) are calculated in advance for groups of 16.

Although the preceding pseudo-code is for a horizontal rescaling, the same methods may be used to calculate the vertical down size coefficients. The vertical down size coefficients are calculated on a per row basis. For the vertical down sizing, the value of step is set with step=256*output rows/input rows.

To illustrate how the system operates, a simple example is hereby provided. If an image needs to be resized down in half (output rows/columns=½*input rows/columns) then every other row/column should be dropped. The step value is calculated with step=256*output/input=256*(½)=128. The reset value for calc_alpha=256. So, using the pseudocode, the system will calculate the keep values as following:

For pixel 1: Calc_alpha_reg=256 so keep=1; Next Calc_alpha=256−256+128=128

For pixel 2: calc_alpha_reg=128 so keep=0; Next Calc_alpha=128+128=256

For pixel 3: calc_alpha_reg=256 so keep=1; Next Calc_alpha=256−256+128=128

For pixel 4: calc_alpha_reg=128 so keep=0; Next Calc_alpha=128+128=256

As illustrated in preceding example, the pattern of dropping every other pixel or row continues reducing the output to half of the original width or height. The system described above is one possible system for scaling down an image, however, there are many other techniques that may be used for scaling down a digital image.

There are many methods of specifically implementing the video pre-processing system. For example, the data path may be implemented in many different ways. The order of the horizontal resizing and vertical resizing stages may be switched. The basic goal is to scale down the full-motion video to a size that is no larger than the full-motion video window that will be used to display the full-motion video.

The internal memory systems used within the video pre-processing system can also be implemented in many different ways. As disclosed earlier, with a motion-JPEG based system a memory buffer of 1.5 KB allows a 32-bit system that can perform 16 cycle burst to output data to the shared memory system with efficient 16 cycle bursts. Furthermore, the use of a ping-pong memory buffer with back pressure allows a system to write into one memory buffer while the other memory buffer is being read by a later processing stage. This concept can further be extended to the use of memory buffers in a circular buffer configuration. Specifically, a writer will sequentially write into a set of ordered memory buffers in a circular round-robin pattern. Similarly, a reader will read out of the memory buffers in the same circular round-robin pattern but slightly behind the writer. In this manner, small temporary differences in the read and write speeds can be accommodated.

Example Application

FIG. 14B illustrates the video pre-processor system 1442 disclosed within the context of an example application of a computer display system designed to minimize shared memory bandwidth usage. In the example of FIG. 14B, the goal of the computer display system is to render a video output signal 1470 that composites encoded full-motion video 1405 into a full-motion video window 1479 within a display frame buffer 1460.

A full-motion video decoder 1462 decodes the encoded full-motion video 1405 and provides the decoded full-motion video to video pre-processor 1442. Using information about the size of the target full-motion video window 1479 from window information source 1407, the video pre-processor 1442 downscales (if necessary) the full-motion video from a native resolution to a resolution that will fit within target full-motion video window 1479. The video pre-processor 1442 also rasterizes the full-motion video information so that it is in better form for use by a video output system. The video pre-processor 1442 writes the down-scaled and rasterized decoded full-motion video 1469 into a full-motion video buffer 1463 in the share memory system 1464.

A pipelined video processor 1490 that incorporates an on-the-fly key color generation system then composites the down-scaled and rasterized decoded full-motion video 1469 and the main frame buffer 1460 to create a video output signal 1470. The pipelined video processor 1490 receives window information 1407 so that the pipelined video processor 1490 knows when full-motion video 1469 needs to be displayed and when normal frame buffer 1460 information needs to be displayed. In the example of FIG. 14B, the pipelined video processor 1490 will spend most of the time reading information from the frame buffer 1460 and using that information to render a video output signal 1470.

For the areas where full-motion video 1469 needs to be displayed, the pipelined video processor 1490 will read in the needed full-motion video 1469 information into a video scaling system 1471 that will upscale the full-motion video 1469 information. Upscaling will occur when the resolution of the full-motion video window 1479 is larger than the native resolution of the full-motion video. The full motion video then goes through a color space conversion with color convert stage 1473. Finally, the full-motion video is merged with the data from the main frame buffer 1460 and the video output signal 1470 is created.

Note that video display system of FIG. 14B includes video scaling logic in both the video pre-processor 1442 (the horizontal resize logic 1420 and the vertical resize logic 1450) and the pipelined video processor 1490 (the video scaling system 1471). However, in most cases only one of these two full-motion video scaling systems will be operating at any time. The full-motion video scaling logic in the video pre-processor 1442 is active when the native resolution of the source full-motion video is larger than the resolution of the full-motion video window 1479. The full-motion scaling logic 1471 in the pipelined video processor 1490 is active when the native resolution of the source full-motion video is smaller than the resolution of the full-motion video window 1479.

The preceding technical disclosure is intended to be illustrative of the methods and systems, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A digital video display system, said digital video display system comprising:

- a frame buffer, said frame buffer to store a pixel representation of a display screen;
- a full-motion video window definition, said full-motion video window definition to define an area of said frame buffer wherein a full-motion video is to be displayed;
- a full-motion video buffer, said full-motion video buffer to store only said full-motion video to be displayed in a display area defined by said full-motion video window definition, said frame buffer and said full-motion video buffer both residing in shared memory; and
- a video pre-processor, said video pre-processor configured to:
  - compare a native resolution of decoded full-motion video information received to said area defined by said full-motion video window definition;
  - in response to a determination that said native resolution is larger than said area defined by said full-motion video window definition:
    - scale down said decoded full-motion video information received to a size no larger than said full-motion video window definition by scaling down said decoded full-motion video information horizontally and vertically before writing a scaled-down digital representation in said full-motion video buffer, wherein luminance data of said decoded full-motion video information is scaled down separately from chrominance data of said decoded full-motion video information and wherein said chrominance data is scaled down based on a sampling ratio between said luminance data and said chrominance data; and
    - write said scaled-down digital representation of said full-motion video in said full-motion video buffer; and in response to a determination that said native resolution is smaller than said area defined by said full-motion video window definition, write a digital representation of said full-motion video in said full-motion video buffer without first upscaling said full-motion video.

2. The digital video display system as set forth in claim 1, said digital video display system further comprising:

a digital video decoder, said digital video decoder to provide said decoded full-motion video information to said video pre-processor.

3. The digital video display system as set forth in claim 2, further comprising:

a pre-processing module comprising said video pre-processor and said digital video decoder, wherein said providing said decoded full-motion video and said scaling down said decoded full-motion video information are performed without accessing a memory external to said pre-processing module.

4. The digital video display system as set forth in claim 3, wherein said video pre-processor is further configured to rasterize said scaled-down digital representation without accessing said memory external to said pre-processing module.

5. The digital video display system as set forth in claim 2, wherein said digital video decoder provides said decoded full-motion video information in a macro block format.

6. The digital video display system as set forth in claim 1 wherein said video pre-processor includes:

a data output system, said data output system to write data to said shared memory system in multi-cycle bursts.

7. The digital video display system as set forth in claim 1 wherein said video pre-processor comprises:

a horizontal resizing logic block to resize said full-motion video in a horizontal direction;

a vertical resizing logic block to resize said full-motion video in a vertical direction; and a memory buffer residing between said horizontal resizing logic block and said vertical resizing logic block.

8. The digital video display system as set forth in claim 1, said digital video display system further comprising:

a video output system, said video output system to read from said frame buffer and from said full-motion video buffer to generate a video output signal.

9. The digital video display system as set forth in claim 8 wherein said video output system comprises an on-the-fly Key color generation system that only reads data from said frame buffer or said full-motion video buffer for each portion of the display screen.

10. The digital video display system as set forth in claim 9 wherein said video pre-processor receives said full-motion video window definition from said on-the-fly Key color generation system.

11. The digital video display system as set forth in claim 1 wherein said video pre-processor outputs said scaled-down digital representation of said full-motion video in a rasterized format.

12. The digital video display system as set forth in claim 1 wherein said video pre-processor is combined with a full-motion video decoder.

13. A method of processing display information within digital video display system, said method comprising:

writing desktop display data in a frame buffer, said frame buffer comprising a pixel representation of a desktop display to be output on a display screen, said pixel representation of said desktop display including a full-motion video window area wherein a full-motion video is to be displayed defined by a full-motion video window definition;

comparing a native resolution of decoded full-motion video information received to said area defined by said full-motion video window definition;

in response to a determination that said native resolution is larger than said area defined by said full-motion video window definition:

processing said decoded full-motion video stream with a video pre-processor, said video pre-processor scaling down said decoded full-motion video stream horizontally and vertically to a size no larger than said full-motion video window area wherein said full-motion video is to be displayed, wherein luminance data of said decoded full-motion video stream is scaled down separately from chrominance data of said decoded full-motion video stream and wherein said chrominance data is scaled down based on a sampling ratio between said luminance data and said chrominance data; and after said processing of said decoded full-motion video stream, writing a scaled down digital representation of said full-motion video into a full-motion video buffer storing only said full-motion video to be displayed, said frame buffer and said full-motion video buffer both residing in shared memory; and in response to a determination that said native resolution is smaller than said area defined by said full-motion video window definition, writing a digital representation of said full-motion video in said full-motion video buffer without first upscaling said full-motion video.

14. The method of processing display information as set forth in claim 13, said method further comprising:

decoding encoded digital video with a digital video decoder, said digital video decoder providing said decoded full-motion video information to said video pre-processor.

15. The method of processing display information as set forth in claim 14, wherein said video pre-processor and said digital video decoder are included in a pre-processing module and wherein decoding said encoded digital video and processing said decoded full-motion video stream are performed without accessing a memory external to said pre-processing module.

16. The method of processing display information as set forth in claim 15, further comprising:

rasterizing said scaled-down digital representation without accessing said memory external to said pre-processing module.

17. The method of processing display information as set forth in claim 14, wherein said digital video decoder provides said decoded full-motion video information in a macro block format.

18. The method of processing display information as set forth in claim 13 wherein said writing said scaled down digital representation of said full-motion video into said full-motion video buffer comprises writing data to said shared memory system in multi-cycle bursts.

19. The method of processing display information as set forth in claim 13 wherein processing a decoded full-motion video stream comprises:

resizing said full-motion video in a horizontal direction; and resizing said full-motion video in a vertical direction.

20. The method of processing display information as set forth in claim 13, said method further comprising:

reading from said frame buffer and from said full-motion video buffer with a video output system to generate a video output signal.

21. The method of processing display information as set forth in claim 20 wherein said video output system comprises an on-the-fly Key color generation system that only reads data from said frame buffer or said full-motion video buffer for each portion of the display screen.

22. The method of processing display information as set forth in claim 20 wherein said video pre-processor receives said full-motion video window definition from said on-the-fly Key color generation system.

23. The method of processing display information as set forth in claim 13 wherein said video pre-processor outputs said scaled-down digital representation of said full-motion video in a rasterized format.

24. The method of processing display information as set forth in claim 13, said method further comprising:

decoding an encoded full-motion video stream with a full-motion video decoder to produce said decoded full-motion video stream.

* * * * *